US008447598B2

(12) United States Patent  
Chutorash et al.

(10) Patent No.: US 8,447,598 B2
(45) Date of Patent: May 21, 2013

(54) VEHICLE USER INTERFACE SYSTEMS AND METHODS

(75) Inventors: Richard J. Chutorash, Rochester Hills, MI (US); Elisabet Anderson, Holland, MI (US); Rodger W. Eich, Holland, MI (US); Jeffrey Golden, Holland, MI (US); Philip J. Vanderwall, Marne, MI (US); Michael J. Sims, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/007,447

(22) Filed: Jan. 14, 2011

(65) Prior Publication Data

US 2011/0257973 A1 Oct. 20, 2011

Related U.S. Application Data

(63) Continuation of application No. 12/794,490, filed on Jun. 4, 2010, now abandoned, which is a continuation of application No. PCT/US2008/085570, filed on Dec. 4, 2008.

(60) Provisional application No. 61/005,419, filed on Dec. 5, 2007.

(51) Int. Cl.
*G10L 15/00* (2006.01)
*H04B 1/38* (2006.01)

(52) U.S. Cl.
USPC .......................................... 704/231; 455/563

(58) Field of Classification Search
USPC .................... 704/231–257; 455/563
See application file for complete search history.

(56) References Cited

U.S. PATENT DOCUMENTS

| 4,390,877 A | 6/1983 | Curran |
| 4,760,394 A | 7/1988 | Takeuchi et al. |

(Continued)

FOREIGN PATENT DOCUMENTS

| EP | 0 660 542 A1 | 6/1995 |
| EP | 1 052 609 B1 | 11/2000 |

(Continued)

OTHER PUBLICATIONS

International Search Report and Written Opinion for Application No. PCT/US2007/088171, dated Jun. 27, 2008, 9 pages.

(Continued)

*Primary Examiner* — Samuel G Neway
(74) *Attorney, Agent, or Firm* — Foley & Lardner LLP

(57) ABSTRACT

A control system for mounting in a vehicle and for providing information to a portable electronic device for processing by the portable electronic device is shown and described. The control system includes a first interface for communicating with the portable electronic device and a memory device. The control system also includes a processing circuit communicably coupled to the first interface and the memory device, the processing circuit configured to extract information from the memory device and to provide the information to the first interface so that the first interface communicates the information to the portable electronic device. The processing circuit is further configured to determine the capabilities of the portable electronic device based on data received from the portable electronic device via the first interface and to determine whether or not to communicate the information to the portable electronic device based on the determined capabilities.

3 Claims, 19 Drawing Sheets

U.S. PATENT DOCUMENTS

| | | | |
|---|---|---|---|
| 4,792,796 | A | 12/1988 | Bradshaw et al. |
| 4,825,200 | A | 4/1989 | Evans et al. |
| 4,827,520 | A | 5/1989 | Zeinstra |
| 5,113,182 | A | 5/1992 | Suman et al. |
| 5,278,547 | A | 1/1994 | Suman et al. |
| 5,475,366 | A | 12/1995 | Van Lente et al. |
| 5,479,155 | A | 12/1995 | Zeinstra et al. |
| 5,479,157 | A | 12/1995 | Suman et al. |
| 5,583,485 | A | 12/1996 | Van Lente et al. |
| 5,614,885 | A | 3/1997 | Van Lente et al. |
| 5,614,891 | A | 3/1997 | Zeinstra et al. |
| 5,619,190 | A | 4/1997 | Duckworth et al. |
| 5,627,529 | A | 5/1997 | Duckworth et al. |
| 5,646,701 | A | 7/1997 | Duckworth et al. |
| 5,661,455 | A | 8/1997 | Van Lente et al. |
| 5,691,848 | A | 11/1997 | Van Lente et al. |
| 5,699,044 | A | 12/1997 | Van Lente et al. |
| 5,708,415 | A | 1/1998 | Van Lente et al. |
| 5,717,387 | A | 2/1998 | Suman et al. |
| 5,854,593 | A | 12/1998 | Dykema et al. |
| 5,903,226 | A | 5/1999 | Suman et al. |
| 5,926,087 | A | 7/1999 | Busch et al. |
| 6,010,403 | A | 1/2000 | Adam et al. |
| 6,020,654 | A | 2/2000 | Chutorash |
| 6,028,537 | A | 2/2000 | Suman et al. |
| 6,067,681 | A | 5/2000 | Zeinstra et al. |
| 6,144,114 | A | 11/2000 | Chutorash |
| 6,154,148 | A | 11/2000 | Fluharty et al. |
| 6,181,255 | B1 | 1/2001 | Crimmins et al. |
| 6,188,889 | B1 | 2/2001 | Tsai |
| 6,212,474 | B1 | 4/2001 | Fowler et al. |
| 6,282,152 | B1 | 8/2001 | Kurple |
| 6,282,407 | B1 | 8/2001 | Vega et al. |
| 6,336,031 | B1 | 1/2002 | Schyndel |
| 6,374,182 | B2 | 4/2002 | Bechtolsheim et al. |
| 6,430,164 | B1 | 8/2002 | Jones et al. |
| 6,472,771 | B1 | 10/2002 | Frese et al. |
| 6,539,358 | B1* | 3/2003 | Coon et al. ............... 704/275 |
| 6,556,813 | B2 | 4/2003 | Tsui |
| 6,603,405 | B2 | 8/2003 | Smith |
| 6,615,023 | B1 | 9/2003 | Ehrensvard |
| 6,771,749 | B1* | 8/2004 | Bansal et al. .......... 379/88.17 |
| 6,825,751 | B1 | 11/2004 | Kita et al. |
| 6,978,126 | B1 | 12/2005 | Blaker et al. |
| 7,050,593 | B1 | 5/2006 | Emerling et al. |
| 7,050,834 | B2* | 5/2006 | Harwood et al. ........... 455/563 |
| 7,116,229 | B1 | 10/2006 | Miramontes |
| 7,228,211 | B1 | 6/2007 | Lowrey et al. |
| 7,257,426 | B1 | 8/2007 | Witkowski et al. |
| 7,346,374 | B2 | 3/2008 | Witkowski et al. |
| 7,349,722 | B2 | 3/2008 | Witkowski et al. |
| 7,516,072 | B2 | 4/2009 | Campbell et al. |
| 7,564,377 | B2 | 7/2009 | Kimchi et al. |
| 7,689,253 | B2* | 3/2010 | Basir ........................ 455/563 |
| 7,787,907 | B2* | 8/2010 | Zeinstra et al. ........... 455/563 |
| 8,103,445 | B2 | 1/2012 | Smith et al. |
| 2001/0033225 | A1* | 10/2001 | Razavi et al. ............. 340/425.5 |
| 2002/0032510 | A1 | 3/2002 | Turnbull et al. |
| 2002/0040271 | A1 | 4/2002 | Park et al. |
| 2002/0054159 | A1 | 5/2002 | Obradovich |
| 2002/0169584 | A1 | 11/2002 | Fu et al. |
| 2003/0096593 | A1 | 5/2003 | Naboulsi |
| 2003/0114202 | A1* | 6/2003 | Suh et al. ................. 455/569 |
| 2003/0210796 | A1 | 11/2003 | McCarty et al. |
| 2003/0236818 | A1 | 12/2003 | Bruner et al. |
| 2004/0054468 | A1 | 3/2004 | Yamada et al. |
| 2004/0104842 | A1 | 6/2004 | Drury et al. |
| 2005/0005298 | A1 | 1/2005 | Tranchina et al. |
| 2005/0015197 | A1 | 1/2005 | Ohtsuji et al. |
| 2005/0024264 | A1 | 2/2005 | Harrison |
| 2005/0053008 | A1 | 3/2005 | Griesing et al. |
| 2005/0197747 | A1 | 9/2005 | Rappaport et al. |
| 2005/0208968 | A1 | 9/2005 | Codeville |
| 2005/0239434 | A1 | 10/2005 | Marlowe |
| 2005/0242970 | A1 | 11/2005 | Blaker et al. |
| 2005/0245272 | A1 | 11/2005 | Spaur et al. |
| 2006/0158344 | A1 | 7/2006 | Bambini et al. |
| 2006/0214813 | A1 | 9/2006 | Witkowski et al. |
| 2006/0232376 | A1 | 10/2006 | Blaker |
| 2006/0232377 | A1 | 10/2006 | Witkowski |
| 2007/0057810 | A1 | 3/2007 | Bos et al. |
| 2007/0123191 | A1* | 5/2007 | Simpson ..................... 455/345 |
| 2007/0143798 | A1 | 6/2007 | Jira et al. |
| 2007/0152798 | A1 | 7/2007 | Witkowski |
| 2007/0197172 | A1 | 8/2007 | Witkowski et al. |
| 2007/0213092 | A1* | 9/2007 | Geelen ...................... 455/556.1 |
| 2008/0027643 | A1* | 1/2008 | Basir et al. ................ 701/213 |
| 2008/0068205 | A1 | 3/2008 | Witkowski |
| 2008/0192659 | A1 | 8/2008 | Santavicca |
| 2008/0221742 | A1 | 9/2008 | DiCroce |
| 2008/0244050 | A1* | 10/2008 | Wong et al. ................. 709/223 |
| 2009/0085728 | A1 | 4/2009 | Catten et al. |
| 2010/0100310 | A1 | 4/2010 | Eich et al. |

FOREIGN PATENT DOCUMENTS

| | | |
|---|---|---|
| EP | 1 267 111 A1 | 12/2002 |
| EP | 1 304 695 A2 | 4/2003 |
| EP | 1 338 866 A2 | 8/2003 |
| EP | 1 357 358 A1 | 10/2003 |
| EP | 1 058 220 B1 | 2/2004 |
| EP | 1 387 145 A1 | 2/2004 |
| EP | 1 568 834 A1 | 8/2005 |
| EP | 1 655 677 A2 | 5/2006 |
| EP | 1 698 518 A2 | 9/2006 |
| EP | 1 493 994 B1 | 8/2007 |
| EP | 1 959 410 A1 | 8/2008 |
| EP | 1 560 200 B1 | 11/2008 |
| GB | 2 375 397 B | 5/2004 |
| JP | 01-290032 | 11/1989 |
| JP | 2001-297527 A | 10/2001 |
| JP | 2001-304875 A | 10/2001 |
| JP | 2002-087183 A | 3/2002 |
| JP | 2002-169584 A | 6/2002 |
| JP | 2002-171217 A | 6/2002 |
| JP | 2003-244343 A | 8/2003 |
| JP | 2003-304339 A | 10/2003 |
| JP | 2004-153660 A | 5/2004 |
| JP | 2005-236560 A | 9/2005 |
| JP | 2005-284886 A | 10/2005 |
| JP | 2006-033377 | 2/2006 |
| JP | 2006-321470 A | 11/2006 |
| JP | 2007-256137 | 10/2007 |
| WO | WO-00/75905 A1 | 12/2000 |
| WO | WO-01/67413 | 9/2001 |
| WO | WO-2004/043750 A2 | 5/2004 |
| WO | WO-2004/077729 A2 | 9/2004 |
| WO | WO-2005/002080 A1 | 1/2005 |
| WO | WO 2006/063602 A1 | 6/2006 |
| WO | WO 2007/123798 A1 | 11/2007 |
| WO | WO-2008/079811 A1 | 7/2008 |
| WO | WO 2008/079889 A2 | 7/2008 |
| WO | WO 2008/079891 A2 | 7/2008 |
| WO | WO 2008/091727 A1 | 7/2008 |
| WO | WO 2009/073806 A2 | 6/2009 |

OTHER PUBLICATIONS

International Search Report and Written Opinion for Application No. PCT/US2007/088175, dated Sep. 19, 2008, 9 pages.

International Search Report and Written Opinion for Application No. PCT/US2008/085570, dated Oct. 22, 2009, 12 pages.

International Search Report and Written Opinion for Application. No. PCT/US2008/050436, dated Jun. 18, 2008, 9 pages.

MP3CAR.COM, MP3Car.com Wiki, http://www.mp3car.com, believed to be available by at least Jan. 12, 2007, 11 pages.

Office Action for European Patent Application No. 07869543.4, dated Dec. 22, 2010, 6 pages.

Office Action for European Patent Application No. 08705741, dated Jan. 13, 2010, 3 pages.

Office Action for European Patent Application No. 07869543.4, dated Oct. 14, 2009, 3 pages.

Invitation to Pay Additional Fees and Communication Relating to the Results of the Partial International Search dated Jun. 12, 2009 as received in PCT/US2008/085570, 6 pages.

Office Action for European Patent Application No. 07 869 539.2, dated Jun. 25, 2010, 5 pages.

Dahn, et al., "Combinatorial Study of Sn1-xCox (0 < x < 0.6) and [Sn0.55Co0.45]1-yCy (0 < y < 0.5) Alloy Negative Electrode Materials for Li-Ion Batteries," Journal of Electrochemical Society, (2006), 153:A361-365.

http://en.wikipedia.org/wiki/Near_Field_Communication, Oct. 17, 2007, 6 pages.

International Search Report and Written Opinion for International Patent Application No. PCT/US2009/065855, dated Jun. 11, 2010.

Japan Office Action dated May 15, 2012 as received in corresponding Japan Application No. 2009-543188 and its English Translation, 7 pages.

Japan Office Action dated May 15, 2012 as received in corresponding Japan Application No. 2009-547339 and its English Translation.

Office Action for European Application No. 04751431.0, mail date Dec. 14, 2009, 5 pages.

Office Action for U.S. Appl. No. 10/558121, dated Jan. 20, 2010, 9 pages.

Office Action for U.S. Appl. No. 10/558,121, dated Jul. 9, 2010, 11 pages.

Office Action in JP 2010-537078 dated Oct. 2, 2012.

Office Action in JP Appln No. 2009-543188 dated Nov. 6, 2012.

Office Action in U.S. Appl. No. 13/428,857 dated Oct. 16, 2012.

Office Action in U.S. Appl. No. 12/328,663 dated Apr. 26, 2012.

Office Action in U.S. Appl. No. 12/519,735 dated Jun. 13, 2012.

Office Action received for U.S. Appl. No. 12/328,663, dated Nov. 23, 2011, 13 pages.

Office Action U.S. Appl. No. 10/558,121 dated Apr. 11, 2012.

PCT Invitation to Pay Additional Fees and Partial International Search Report as received in PCT/US2009/065855, dated Mar. 19, 2010.

Written Opinion for International Patent Application No. PCT/US2004/017058, mailed Oct. 15, 2004.

* cited by examiner

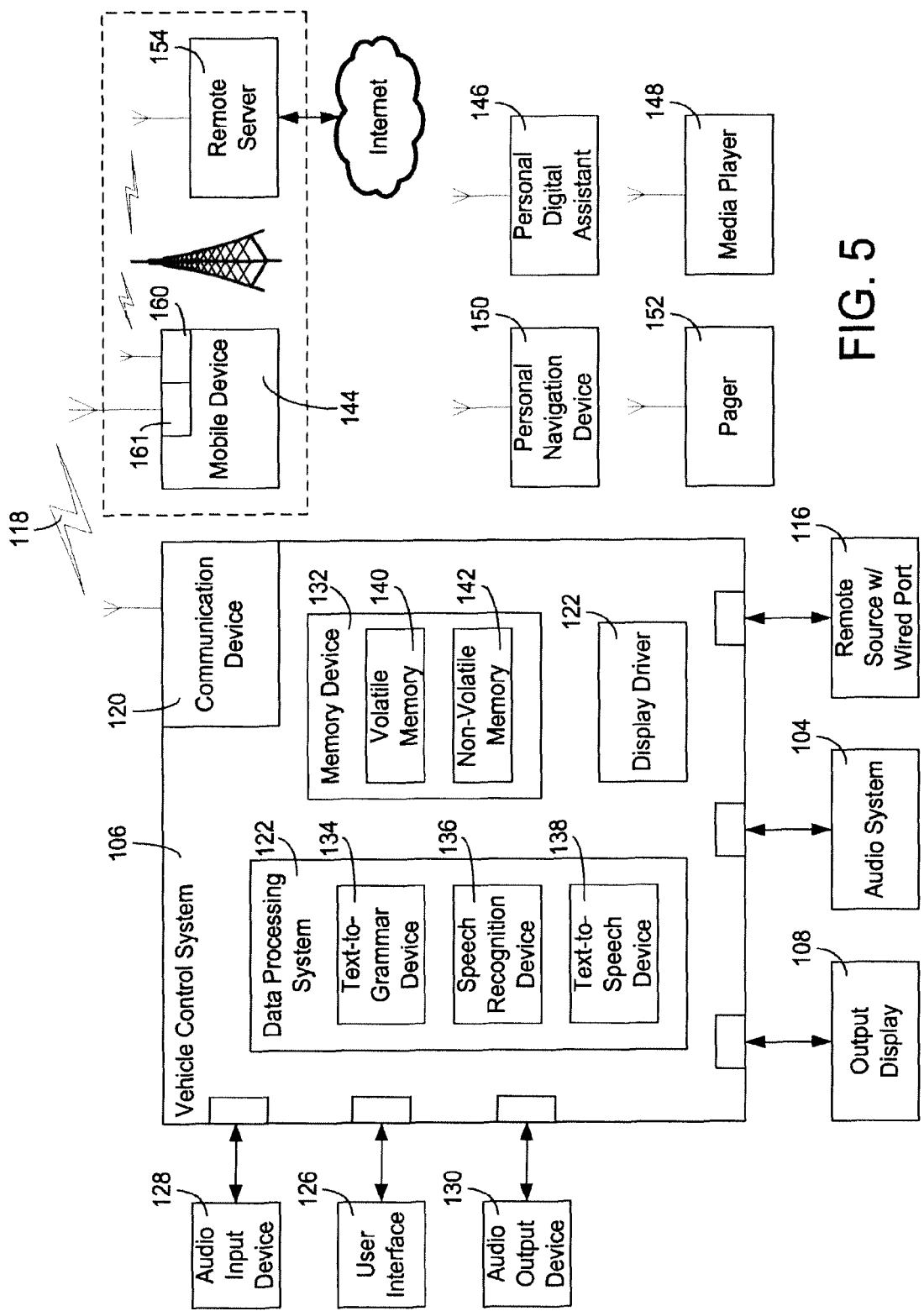

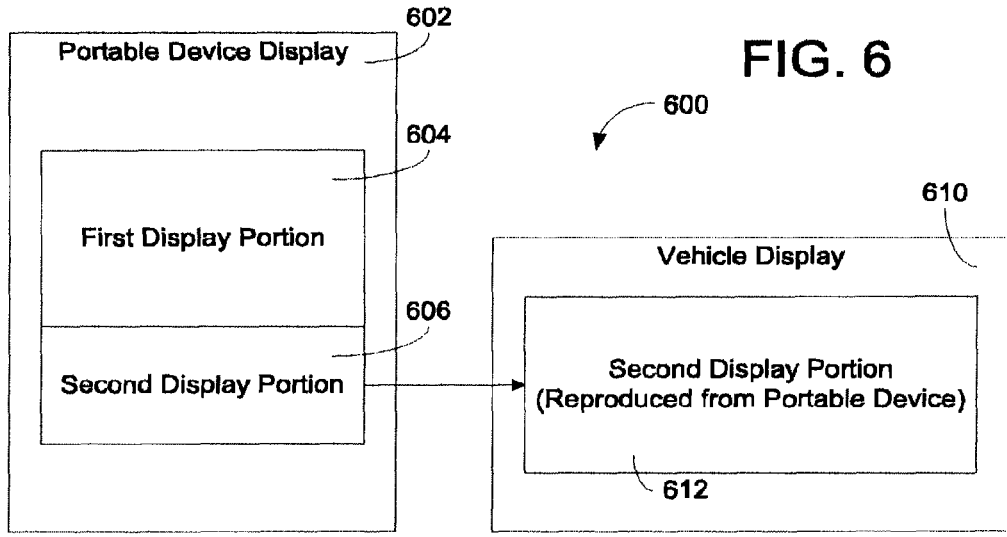
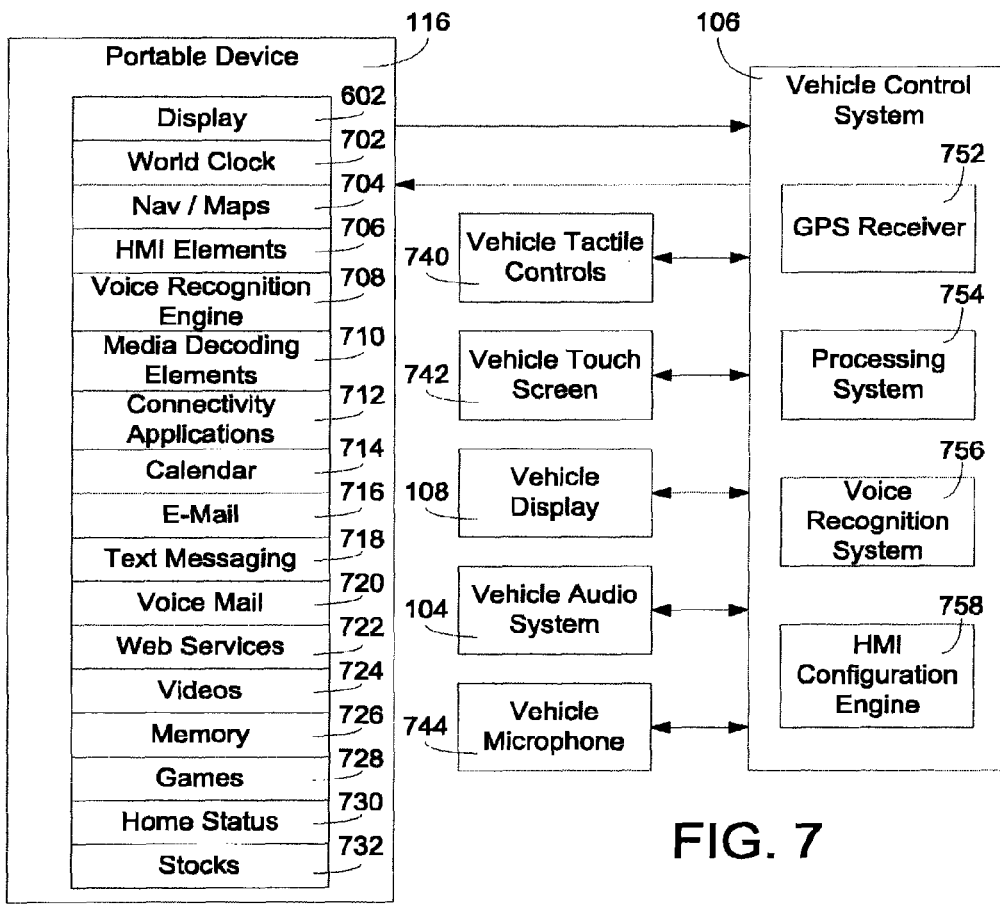

VEHICLE USER INTERFACE SYSTEMS AND METHODS

CROSS REFERENCE TO RELATED APPLICATIONS

The present application is a Continuation of U.S. application Ser. No. 12/794,490 filed Jun. 4, 2010, which is a Continuation of International Application No. PCT/US2008/085570, filed Dec. 4, 2008, which claims priority to U.S. Provisional Application No. 61/005,419, filed Dec. 5, 2007. The foregoing applications are incorporated by reference herein in their entirety.

BACKGROUND

The present disclosure relates generally to the fields of communication, navigation, and/or user control in a motor vehicle.

Vehicles typically include a number of electronics systems and subsystems such as an audio system, a mobile telephone system, a navigation system, an in-vehicle entertainment system, an HVAC system, an engine management system, and the like that may be controlled by an in-vehicle user interface and an in-vehicle control system.

Conventional vehicle control systems typically do not interface well with remote sources and portable devices such as cellular phones. Even when vehicle control systems are configured to interface with remote sources and portable devices, the human-machine interfaces and processing electronics are typically separate, look very different, and are difficult to use together. Applications provided on a portable device are typically not configured to interact with a vehicle and vice versa. There is a need for improved user interface features and/or connectivity features relating to vehicle control systems, remote sources, and/or portable devices. There is a need for effective display reproduction and/or user interface reproduction from a remote source to an in-vehicle display or other in-vehicle interface.

It would be desirable to provide a system and/or method that satisfies one or more of these needs or provides other advantageous features. Other features and advantages will be made apparent from the present specification. The teachings disclosed extend to those embodiments that fall within the scope of the disclosure, regardless of whether they accomplish one or more of the aforementioned needs.

SUMMARY

One embodiment relates to a control system for mounting in a vehicle and for providing information to a portable electronic device for processing by the portable electronic device. The control system includes a first interface for communicating with the portable electronic device and a memory device. The control system also includes a processing circuit communicably coupled to the first interface and the memory device, the processing circuit configured to extract information from the memory device and to provide the information to the first interface so that the first interface communicates the information to the portable electronic device. The processing circuit is further configured to determine the capabilities of the portable electronic device based on data received from the portable electronic device via the first interface and to determine whether or not to communicate the information to the portable electronic device based on the determined capabilities. The first interface may be or include a transceiver configured to form a wireless communication with a portable electronic device or circuitry and/or connection hardware for forming a wired connection to the portable electronic device.

Another embodiment relates to using a vehicle control system for voice typing purposes. The vehicle control system includes an interface for coupling to an audio input device mounted to the vehicle interior and for receiving voice information from a user. The interface may be circuitry and/or connection hardware for forming a functional connection to an audio input device such as a microphone. A processing circuit of the vehicle control system includes a speech recognition module configured to convert the voice information received at the second interface into text characters. The text characters from the speech recognition module are transmitted to the portable electronic device from the processing circuit and/or a transmitter associated therewith. The vehicle control system can also include an interface for providing display information to an electronic display device mounted to the vehicle interior and the processing circuit may be configured to enter a voice-typing mode of operation. During the voice-typing mode of operation, the processing circuit can be configured to cause the electronic display device to display the text characters from the speech recognition module. The processing circuit may be further configured to magnify a recently converted text character relative to previously converted text characters on the electronic display device. The processing circuit may also be configured to communicate the text characters to the portable electronic device in a format that causes the text characters to be entered into a text field displayed on the portable electronic device. The processing circuit can also be configured to communicate the text characters to the portable electronic device in a format that causes the portable electronic device to provide the text characters to an application running on the portable electronic device (e.g., a text-messaging application, a calendaring application, a mobile commerce application, a web-browsing application, a gaming application, a navigation application, an e-mail application, a media application, and a notes application, etc.).

Another embodiment relates to using a vehicle control system configured to transmit information to a portable electronic device; the information being formatted for further processing by a software application of the portable electronic device. The format may be a WAP format, a WXML format, an HTML format, an XHTML format, an XML format and/or any other suitable format for transferring over a radio frequency wireless communications link from a vehicle control system to a nearby portable electronic device. The vehicle control system may further include an interface configured to receive position information from at least one of a global positioning system receiver and a compass. The information communicated to the portable electronic device may include the position information. The position information may be formatted to be transmitted to a remote source from the portable electronic device and/or transmitted to the portable electronic device with data for transmitting the position information to the remote source from the portable electronic device.

Another embodiment relates to using a vehicle control system having a processing circuit configured to receive information regarding a vehicle operational mode (e.g., from a vehicle subsystem), and to provide information to a portable electronic device including a command to disable a feature of the portable electronic device. The operational mode may be a driving mode and the information provided to the portable electronic device may include a command to disable at least one of a local display of the portable electronic device, a text messaging capability of the portable electronic device, and an e-mail capability of the portable electronic device. The processing circuit may be configured to send the command to the phone based on a speed of the vehicle.

Another embodiment relates to a vehicle control system having a processing circuit configured to utilize the vehicle subsystem information and position information received from a global position system receiver to calculate a precise vehicle location relative to the position information. The precise vehicle location information may be transmitted to the portable electronic device for processing, display, storage, or otherwise. The processing circuit may be further configured to utilize locationing information received and/or determined by the portable electronic device in the calculation of the precise vehicle location.

Another embodiment relates to a vehicle control system having a processing circuit configured to send information to a portable electronic device; the information may include software update information formatted for installation on the portable electronic device once received by the portable electronic device and/or a command for the portable electronic device to obtain a software update from a remote source. The processing circuit is configured to determine whether or not the portable electronic device is in need of the update based on capabilities of the portable electronic device determined by the processing circuit based on data received from the portable electronic device. The processing circuit may also or alternatively be configured to use data received from the portable electronic device to determine whether an update is available for the processing circuit and/or for another vehicle subsystem. The processing circuit may be configured to request the update from a remote source via the portable electronic device, receive the update via the first interface from the portable electronic device and the remote source, and/or to process the update.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 5 is a more detailed embodiment of the vehicle control system and remote source of FIG. 4, according to an exemplary embodiment;

FIG. 6 is a block diagram of a display reproduction system, according to an exemplary embodiment;

FIG. 7 is a block diagram of a portable electronic device interfacing with a vehicle control system using wired or wireless communications, according to an exemplary embodiment;

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

The vehicle control systems described in FIGS. 1-5 are examples of a vehicle systems that may be used in conjunction with the systems and methods of the present disclosure. Control circuits and processing components of the vehicle control systems shown in FIGS. 1-5 can be configured to complete and/or facilitate the features described herein. For example, executable computer code for conducting one or more of the processes described herein may be stored in a memory device communicably coupled to a processing circuit or component configured to execute the stored computer code.

Figure 1:
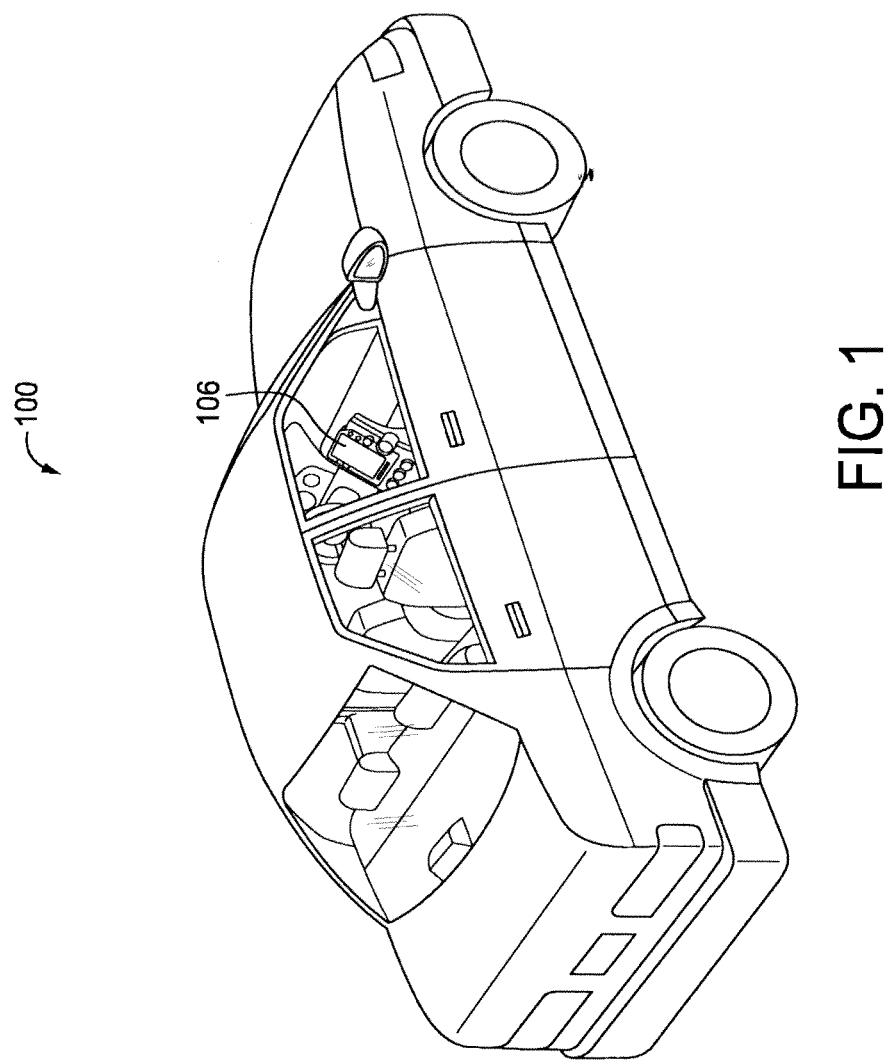
FIG. 1 is a perspective view of a vehicle that includes a number of vehicle systems, including a vehicle control system, according to an exemplary embodiment.

Referring to FIG. 1, a perspective view of vehicle 100 is illustrated. Vehicle 100 includes a number of subsystems for user convenience and entertainment. For example, vehicle 100 may include a heating, ventilation, and air-conditioning (HVAC) system, a sound system, and a vehicle control system 106 (e.g., media system, navigational system, entertainment system, display system, communications systems, etc.). The HVAC system, sound system, and other systems may be coupled to vehicle control system 106, which is capable of controlling and monitoring a variety of systems, automatically or by a manual user command. It is noted that in various exemplary embodiments, vehicle 100, the HVAC system, the sound system, and other vehicle systems may be of any past, present, or future design capable of being physically coupled to, communicably coupled to, and interacting with vehicle control system 106.

Figure 2:
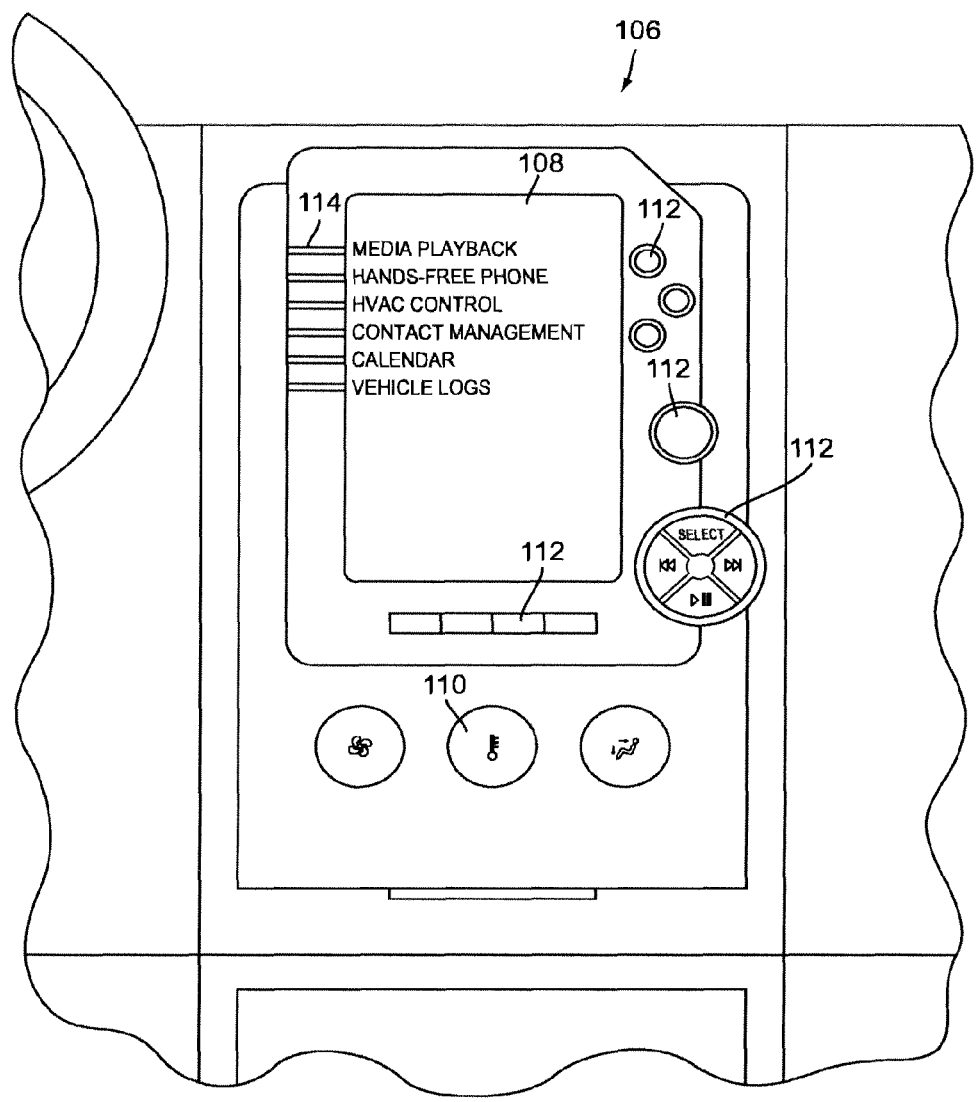
FIG. 2 is a front elevation view of the vehicle control system of FIG. 1, according to an exemplary embodiment.

Referring to FIG. 2, one exemplary embodiment of vehicle control system 106 is shown. Vehicle control system 106 generally includes an output display 108, one or more knobs 110, one or more pushbuttons 112, and one or more tactile user inputs or pushbuttons 114, which facilitate controlling various vehicle functions. Output display 108 may be configured to display data related to the control of the vehicle functions. In one exemplary embodiment, output display 108 may be a touch-screen display, while in other exemplary embodiments, may be anon-touch sensitive display. In still other exemplary embodiments, output display 108 may be of any technology (e.g., LCD, DLP, plasma, CRT), configuration (e.g., portrait or landscape), or shape (e.g., polygonal, curved, curvilinear). Output display 108 may be a manufacturer installed output display, an aftermarket output display, or an output display provided by or installed by any other source. Output display 108 may be an embedded display (e.g., a display embedded in the control system or other vehicle systems, parts, or structures), a standalone display (e.g., a portable display, a display mounted on a movable arm), or a display having any other configuration. User interface elements (e.g., output knobs 110 and pushbuttons 112 and 114) may be configured to control functions of the HVAC system such as fan speed, cabin temperature, or routing of air flow, to control playback of media files over the sound system, to control retrieval of phonebook entries, to control a function of a connected remote source, or to control any other desired vehicle function.

User interface elements such as pushbuttons 114 typically allow for the selection and display of various functions of vehicle control system 106 including sound system control, media system control, display system control, communications system control, hands-free phone use, HVAC system control, contact or address/phone book management, calendar viewing and modification, and vehicle data logging. The operation of pushbutton 114 for media playback may display a media playback menu screen or execute commands that allow the user to view, select, sort, search for, and/or play audio or video files by tactile or oral command. The operation of pushbutton 114 for hands-free phone operation may display a menu screen or execute commands that allow the user to connect vehicle control system 106 to a mobile phone so that speaking into the vehicle console of vehicle control system 106 operates the mobile phone. The operation of pushbutton 114 for HVAC control may display a menu screen or execute commands that allow the user to control cabin temperature and air flow by tactile or oral command. The operation of pushbutton 114 for contact management may display a menu screen or execute commands that allow the user to view, list, select, sort, search for, edit, and/or dial one or more entries containing personal contact information, by use of a tactile or oral command. The operation of pushbutton 114 for calendar management may display a menu screen or execute commands that allow the user to view, list, select, sort, search for, edit, and/or create one or more entries containing personal schedule information by tactile or oral command. The operation of pushbutton 114 for vehicle log management may display a menu screen or execute commands that allow the user to input, view, select and/or reset information related to the vehicle operation (e.g., fuel economy, engine temperature, distance to empty, etc.) by tactile or oral command.

Pushbuttons 114 (and/or any other user interface element(s)) of vehicle control system 106 may be used to control other vehicle subsystems such as, but not limited to, vehicle door locking systems, vehicle cruise control systems, seat control systems, window control systems, hands-free communication systems, vehicle lighting systems, vehicle radio systems, wireless control systems, media control systems, and/or any other control system that may accept user input. According to an exemplary embodiment, user interface elements, display elements, audio input and output elements and the like mounted in the vehicle and communicably coupled to vehicle control system 106 may be used to provide input and/or output features to a connected (e.g., wired, wirelessly) portable electronic device brought into the vehicle.

Figure 3:
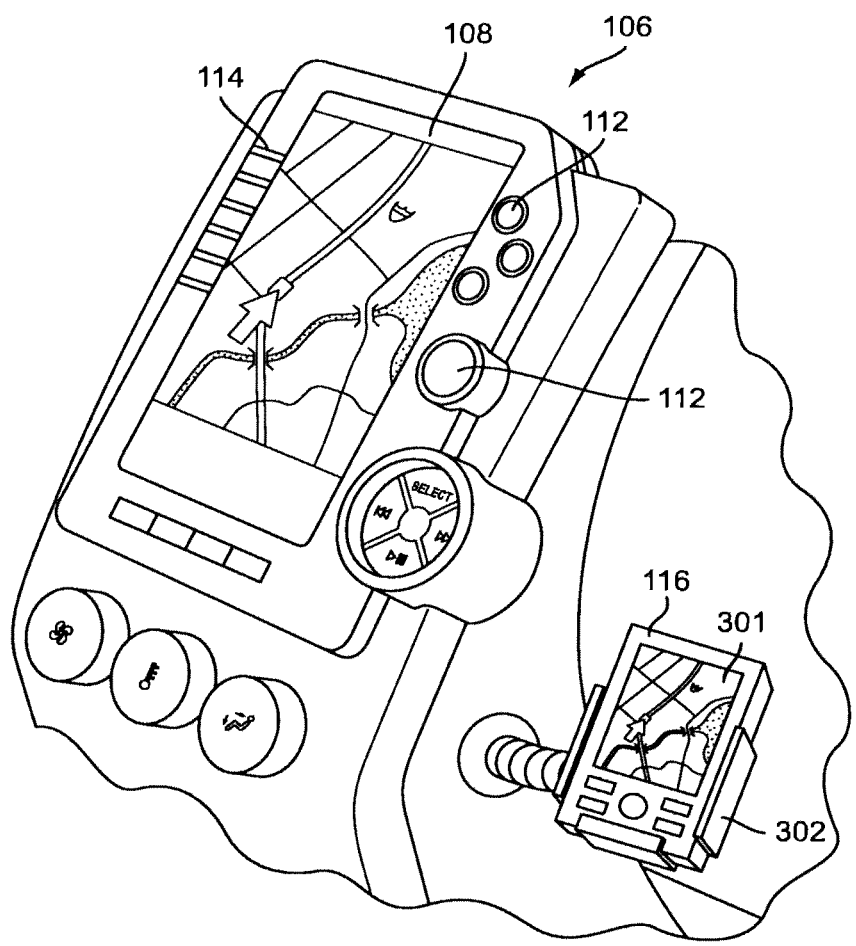
FIG. 3 is a cutaway perspective view of a portable electronic device communicably coupled to the vehicle control system of FIG. 1, according to an exemplary embodiment.

Referring now to FIG. 3, a portable electronic device 116 is shown near and in communication with vehicle control system 106. According to various exemplary embodiments, portable electronic device 116 may communicably couple to vehicle control system 106 via a wired or wireless connection. In the embodiment shown in FIG. 3, portable electronic device 116 may attach to or physically rest in a holder 302 configured to hold portable electronic device 116 and provide a physical connection (e.g., a power charging connection, a communication link connection, etc.) to vehicle control system 106. According to one exemplary embodiment, the connection may allow for information to be transmitted between portable electronic device 116 and vehicle control system 106 (e.g., the display 301 of portable electronic device 116 is shown duplicated on display 108 of vehicle control system 106, and display 301 may be altered using pushbuttons 112, 114). As shown, vehicle control system 106, and more particularly display 108 is replicating display information shown on portable electronic device 116's display 301. According to various alternative embodiments, user interface features of vehicle control system 106 can be shared with connected portable electronic device 106, portable device 106 can replicate display information shown on display 108, vehicle control system 106 can provide information to portable electronic device 116 for additional processing, and/or portable electronic device 116 can provide information to vehicle control system 106 for processing.

Figure 4:
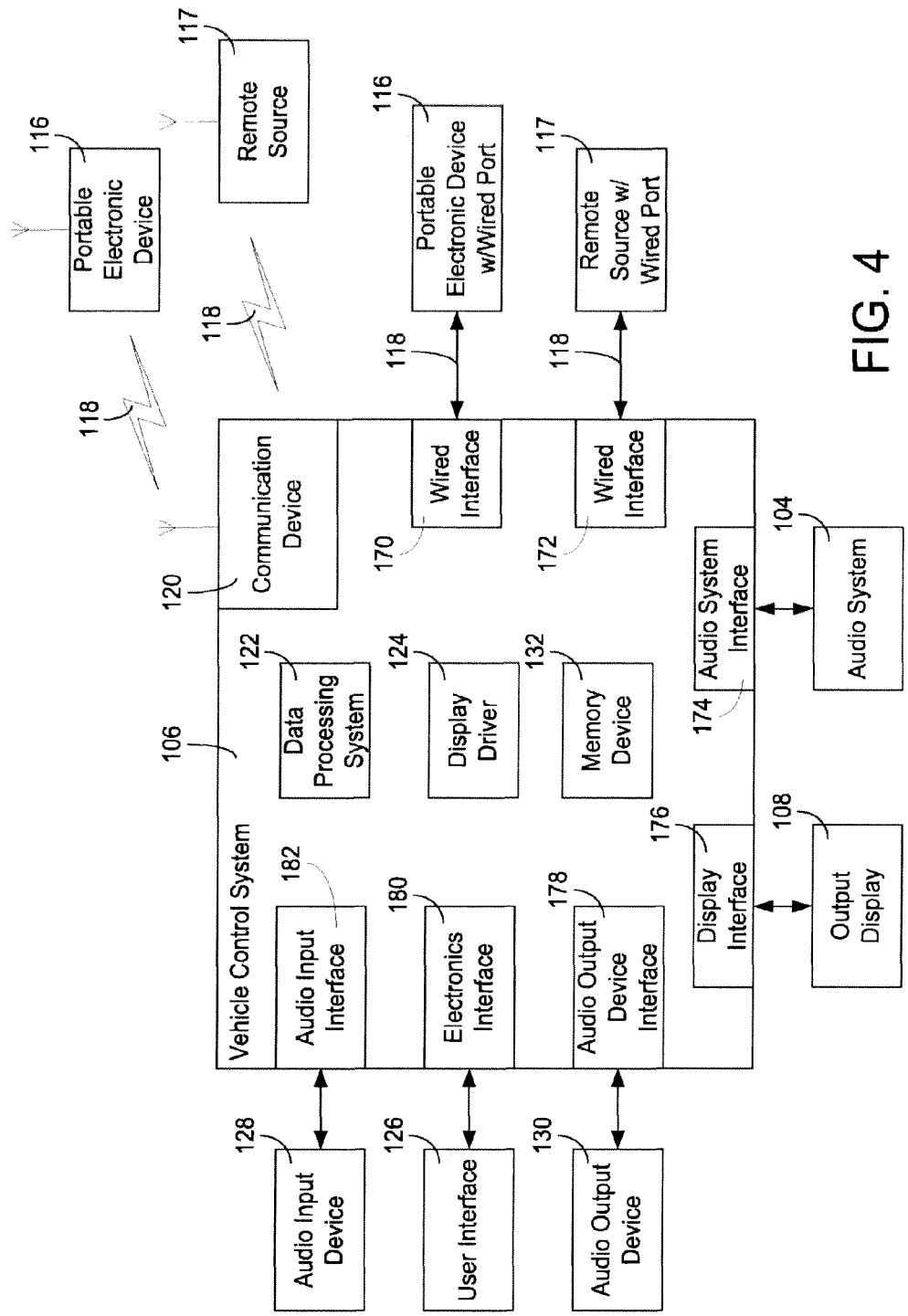
FIG. 4 is a block diagram of the vehicle control system of FIG. 1, according to an exemplary embodiment.

Referring now to FIG. 4, vehicle control system 106 is capable of accessing data (e.g., pieces of information, commands, streaming information, data files, etc.) from a portable electronic device 116 or another remote source 117 over a communication link 118. For example, vehicle control system 106 may access media files, phonebook data files, display information, voice information, applications, application programming interfaces (APIs), calendar data, or any other accessible data for use by vehicle control system 106. Vehicle control system 106 may be capable of accessing data files from multiple remote sources over a single communication link or multiple communication links. Vehicle control system 106 may also send and receive requests, signals, files, commands, messages (e.g., text messages, voice messages, etc.), voice information, audio information, display information, meta information, stream data or information, and any other type of data to and/or from portable electronic device 116 and/or another remote source 117 over communication link 118.

Vehicle control system 106 is shown to include a communication device 120, a data processing system 122, a display driver 124, a user interface 126, an audio input device 128, an audio output device 130, an output display 108, and a memory device 132.

Communication device 120 is generally configured to establish communication link 118 with portable electronic device 116 or another remote source 116. In one exemplary embodiment, vehicle control system 106 may establish a wireless communication link such as with a Bluetooth communications protocol, an IEEE 802.11 protocol, an IEEE 802.15 protocol, an IEEE 802.16 protocol, a cellular phone protocol, another mobile phone protocol, a shared wireless access protocol-cord access (SWAP-CA) protocol, a wireless universal serial bus (USB) protocol, or any other suitable wireless technology. In another exemplary embodiment, vehicle control system 106 may establish a wired communication link such as with USB technology, IEEE 1394 technology, Firewire technology, optical technology, other serial or parallel port technology, or any other suitable wired link. According to various other exemplary embodiments, vehicle control system 106 and/or communication device 120 may form wireless and/or wired connections with a plurality of device and source 116s and 117s. Communication links may be formed such that communication device 120 may be simultaneously connected to multiple device and source 116s and 117s. Communication device 120 may send and receive one or more data streams, data strings, data files and/or other types of information (e.g., non-file based data, file based data, etc.) from connected devices and remote sources. In various exemplary embodiments, the communicated information may be, represent, or include text, numeric data, audio, video, program data, command data, information data, coordinate data, image data, streaming media, or any combination thereof.

Data processing system 122 (e.g., processing electronics, processing circuit, processing system, etc.) is coupled to communications device 120 and is generally configured to control and/or facilitate each function of vehicle control system 106. Data processing system 122 may facilitate speech recognition capabilities of vehicle control system 106 for the convenience of the user. Data processing system 122 may include digital or analog processing components and/or be of any past, present, or future design that facilitates control or provides processing features to vehicle control system 106. Data processing system 122 may be a single data processing device or multiple data processing devices. Data processing system 122 may be a data processing device having data processing sub-devices or components. Data processing system 122 may include any combination of program software and hardware capable of providing control, display, communications, input and output features to the vehicle. Data processing system 122 may coordinate, control, and/or facilitate the various devices, components and features of vehicle control system 106 (e.g., communications device 120, output display 108, display driver 24, memory device 132, audio system 104, user interface 126, audio input device 128, audio output device 130, etc).

According to an exemplary embodiment, data processing system 122 is communicably coupled to memory device 132 and is configured to extract information from memory device 132 and to provide information to a first interface such as communication device 120 or wired interface 170 so that the first interface communicates the information to the portable electronic device 116 connected via a wired or wireless connection. Data processing system 122 may further be configured to determine the capabilities of the connected portable electronic device based on data received from the portable electronic device via the first interface and to determine whether or not to communicate the information (e.g., certain types of information, specific information, update information, navigation information, information for processing by the portable electronic device, etc.) to the portable electronic device based on the determined capabilities.

Display driver 124 is coupled to output display 108 and is typically configured to provide an electronic signal to output display 108. In one exemplary embodiment, the electronic signal may include the text and/or numeric data of the data files, while in other exemplary embodiments, any other desired data may be included with the text and/or numeric data or by itself in the electronic signal to output display 108. In another exemplary embodiment, display driver 124 may be configured to control output display 108 with touch-screen capabilities, while in other exemplary embodiments, display driver 124 may be configured to control output display 108 without making use of touch-screen capabilities. Display driver 124 may include any number of functions, software or hardware, to facilitate the control and display of images on output display 108. In still other exemplary embodiments, display driver 124 may be of any past, present, or future design that allows for the control of output display 108.

User interface 126 is typically configured to facilitate tactile user interaction with vehicle control system 106. In various exemplary embodiments, user interface 126 may include pushbuttons or rotatable knobs as in the exemplary embodiment of FIG. 2 in any similar or dissimilar configuration or may include other tactile user contact points.

Audio input device 128, for example a microphone, is configured to receive the utterance of a user for transmission to data processing system 122 for speech recognition so that the functions of vehicle control system 106 may be operated by voice command. Audio output device 130, for example a built-in speaker, is configured to provide the user with an audio prompt of various functions, such as user selection confirmation.

Memory device 132 is configured to store information and data for accessing by vehicle control system 106. For example, memory device 132 may store data input by remote source 116, data created by data processing system 122 that may be used later, intermediate data of use in current calculation or process, computer code for execution by data processing system 122 (e.g., the computer code for completing the various processes described herein), any other information or data of use by vehicle control system 106, and/or information that may be communicated to a connected portable electronic device or remote source.

Referring still to FIG. 4, vehicle control system 106 is shown to includes interfaces 170-182. Interfaces 170-182 can include any hardware and/or electronics for communicably coupling to each interface's respective connected device. The interfaces can include electronics local to the vehicle control system which may connect directly or indirectly to the portable electronic device. In some embodiments, one or more cords, connectors, or other electronics may be included with or between the vehicle control system interfaces and the portable electronic devices.

Audio input interface 182 can be configured to physically couple a audio input device 128 (e.g., via a corded connection) to vehicle control system 106. Signals from audio input device 128 can be received at audio input interface 182, and filtered, interpreted, or otherwise processed, and routed or provided to electronics of vehicle control system 106 (e.g., to data processing system 122 or another processing circuit of the vehicle control system). Electronics interface 180 may be configured to communicably couple to wiring, a harness, or another connection scheme associated with user interface electronics 126. For example, buttons, switches, LEDs or other user interface elements located throughout the vehicle interior may provide signals to and/or receive signals from electronics interface 180. Electronics interface 180 may be configured to control the activity of the connected user interface elements, interpret received signals, and/or to route received signals to appropriate processing circuitry such as data processing system 122. Audio output device interface 178 may be configured to receive audio signals from data processing system 122 or other processing circuitry of vehicle control system 106 and to provide the received audio signals to audio output device 130. Audio output interface 178 may convert digital signals to analog, amplify the signals, normalize the signals, or otherwise before providing the signals (or a transformed version of the audio signals) to audio output device 130. Display interface 176 may be configured to receive control signals from data processing system 122 or other processing circuitry of vehicle control system 106, convert the control signals into analog or digital signals for the particular output display connected to display interface 176, or otherwise configured to provide display information from vehicle control system to output display 108. Audio system interface 174 may be configured to receive signals from data processing system 122 or other processing circuitry of vehicle control system 106 and to route the signals to audio system 104. Audio interface 174 may conduct any number of processing tasks (e.g., A/D conversion, D/A conversion, decoding, normalizing, filtering, etc.) on audio signals prior to providing the audio signals (or a transformed version of the audio signals) to audio system 104. Wired interface 172 may include any number of jacks, terminals, solder points, cords, or other hardware for physically coupling a cord or other hardware linkage system formed between wired interface 172 and remote source 117 that may include a wired port. Wired interface 170 may be configured similarly or differently from wired interface 170 and may be configured to physically couple (directly or indirectly) personal electronic device 116 to vehicle control system 106 and/or to vehicle control system 106's processing electronics (e.g., data processing system 122). Wired interfaces 172, 170 may be, for example, a USB terminal and associated hardware as described below or otherwise. According to other exemplary embodiments, wired interfaces 172, 170 may be proprietary interfaces (e.g., an Apple iPod interface, etc.). Wired interfaces 172, 170 may merely include connectors or terminals for connecting vehicle control system 106 and another device or can be or include the connectors or terminals in addition to electronics (e.g., filters, converters, security circuitry, power charging circuitry) that facilitates the communicative/functional connection between vehicle control system 106 (e.g., and its various processing circuitry) and the connected devices. According to various exemplary embodiments, communication device 120 may be considered an interface for wirelessly connecting vehicle control system 106 and remote or portable devices such as portable device 116 and remote source 117.

Referring to FIG. 5, vehicle control system 106 is shown in greater detail and as communicating with a number of different systems/devices via wired or wireless communications. Data processing system 122 is shown to include a text-to-grammar device 134, a speech recognition device 136, and a text-to-speech device 138. Data processing system 122 may include any number of additional hardware modules, software modules, or processing devices (e.g., additional graphics processors, communications processors, etc.).

Text-to-grammar device 134 is preferably coupled to communication device 120 and is generally configured to generate a phonemic representation of text and/or numeric data provided to the text-to-grammar device. The text and/or numeric data can be provided to text-to-grammar device 134 by data processing device 122, memory device 132, and/or communication device 120. The vehicle control system may receive the text and/or numeric data from any number of the wired or wirelessly connected remote sources. The phonetic representation of the text and/or numeric data may be configured to facilitate speech recognition of the text or numeric data. After conversion of a set of text (e.g., a command, a word, etc.) to a phonemic representation, an associated data file, command, or device may be accessed or requested via an oral input received by speech recognition device 136 and by audio input device 128.

Speech recognition device 136 is typically configured to receive an oral input command from a user via audio input device 128. Speech recognition device 136 compares the received oral input command to a set of predetermined input commands, which may have been generated or configured by text-to-grammar device 134. In various exemplary embodiments, the input commands may be related to the playback of a media file, the dialing or input of a phone book entry, the entry or listing of calendar or contact data, the control of the HVAC system, a vehicle navigation system command, a portable electronic device feature, or any other desired function to be performed on data. Speech recognition device 136 may determine an appropriate response to the oral input command received from the user, for example, whether the oral input command is a valid or invalid instruction, what command to execute, whether the command should be provided on to a connected portable electronic device or other remote source, or any other appropriate response. According to an exemplary embodiment, speech recognition device 136 may be able to trigger or activate processing activities and features of a connected portable electronic device. For example, speech recognition device 136 may be able to pass commands to mobile device 144 to facilitate interactive control of mobile device 144 via communication link 118.

Text-to-speech device 138 is generally configured to convert the text and/or numeric information of a data file, data stream, or other data received from mobile device 144, recalled from memory device 132, or otherwise received, into an audible speech representation (e.g., an audio file for playback, audio data for playback by a vehicle audio system, etc.). This functionality may allow vehicle control system 106 to audibly provide feedback or other data to the user via audio output device 130 or audio system 104. For example, vehicle control system 106 may repeat a user selected function back to the user, provide navigational information, announce directions, announce menu options, announce media file information, provide phonebook or contact information, or other information related to data stored in memory 132, remote source 116, remote server 154, etc.

According to various other exemplary embodiments, text-to-grammar functionality, speech recognition functionality, and text-to-speech functionality are implemented primarily in software (e.g., executable modules stored in memory, computer code stored in memory, etc.) and executed by data processing system 122, which may be a general purpose data processing system. According to yet other exemplary embodiments, text-to-grammar functionality, speech recognition functionality, and text-to-speech functionality are implemented partially in software and partially in hardware.

Memory device 132 is shown to include both a volatile memory 140 and a non-volatile memory 142. Volatile memory 140 may be configured so that the contents stored therein may be erased during each power cycle of vehicle control system 106 or vehicle 100. Non-volatile memory 142 may be configured so that the contents stored therein may be retained across power cycles, such that upon vehicle control system 106 and/or vehicle 100 power-up, data from previous system use remains available for the user. According to an exemplary embodiment non-volatile memory 142 may store one or more user profiles, executable computer code files, navigation information, display information, logic modules, display profiles, communications profiles, navigation profiles, and/or any other type of user or system setting file.

According to an exemplary embodiment, vehicle control system 106 may be configured to communicate (e.g., wired, wirelessly) with any suitable remote source (e.g., that includes a transceiver) that is able to interface with vehicle control system 106. In various exemplary embodiments, a connected remote source or portable electronic device may be one or more of a mobile phone 144, a personal digital assistant (PDA) 146, a media player 148, a personal navigation device (PND) 150, a pager, 152, a remote server 154 that may be coupled to the Internet, a handheld personal computer, or various other remote data sources. Connected portable electronic devices may include a storage device, one or more processing devices, and one or more communications devices. According to various exemplary embodiments, connected portable electronic devices such as mobile device 144 may connect to the Internet or any other remote source with first communication device 160 while communicating with vehicle control system 106 using second communication device 161.

Display Reproduction System

Referring now to FIG. 6, a block diagram of a display reproduction system 600 is shown, according to an exemplary embodiment. Display reproduction system may generally include a portable device display 602 of a portable electronic device and a vehicle display 610 (e.g., a display such as output display 108 of vehicle control system 106). Portable device display 602 is shown to include a first display portion 604 and a second display portion 606. The portable device of portable device display 602 may generally be configured to send an image of one or more portable display portions 604, 606 to vehicle control system 106 for reproduction on vehicle display 610. According to the embodiment shown in FIG. 6, only second display portion 606 of portable device display 602 is sent to vehicle display 610 for reproduction. Even when only a single display portion is reproduced on vehicle display 610, an image representing the entire display shown on the portable device may be transmitted to a vehicle system. A check bit, command, or other code sent with the image to the vehicle system may indicate which portion of the image to reproduce. According to other exemplary embodiments, only the portion for reproduction on the vehicle display is sent from portable device display 602 to vehicle display 610. A vehicle system may send the portable device an indication of vehicle display size, resolution, vehicle display size dedicated to display reproduction or other information for describing attributes of the vehicle display.

According to an embodiment where a navigation graphical user interface (GUI) of the portable device is reproduced on vehicle display 610, the navigation software of the portable device may operate with (or may be) software specifically configured for display reproduction on vehicle display 610. This software may have the "brand" or otherwise similar look and feel of the vehicle interfaces. The software may include a definition of the display portion that should be transmitted to vehicle display 610. The software may be configured to only send the most important portion of the navigational image or GUI shown on portable device display 602. Advantageously, this software can be resident and replaceable on portable device display 602, thereby allowing accommodation to new software on portable device display 602 without requiring changes to the software associated with the vehicle. According to other exemplary embodiments, the vehicle or the portable device may be configured to make a determination that the images shown on portable device display 602 would not fit or otherwise be totally represented on vehicle display 610 and to request and/or send a partial image based on the determination.

Vehicle display 610 may be mounted, integrated or otherwise provided to the vehicle interior. According to an exemplary embodiment, the display portion 612 for reproduction is provided to a car head medium display or a head-up display. According to an exemplary embodiment, a vehicle control system of vehicle display 610 includes user interfaces and logic for allowing the user to toggle and/or adjust display reproduction settings. The vehicle control system may be configured to allow a user to set conditions for display reproduction and/or frequency of reproduction. For example, in the situation in which the reproduced image is shown on a car medium display or head-up display, the user may choose to display the reproduced image or images prior to making changes in direction, merges, turns, or otherwise. By way of further example, the vehicle control system may reproduce images when the portable device issues acoustic directions. The reproduced image(s) may be displayed for some period of time (seconds, minutes, etc.) after the acoustic instructions have completed.

According to various exemplary embodiments, the vehicle control system and/or vehicle display system 610 are configured to magnify, invert, sharpen, process, stretch, crop, overlay, process, or otherwise enhance any image portion received from the portable device. The enhancement activity may be user selectable and multiple enhancement activities may be provided at any one time or to any one image. For example, the vehicle control system might be configured to receive a second display portion 606 to invert the colors on the image for easier readability, to adjust the contrast of the image, to adjust the brightness of the image, to outline certain elements of the image, to magnify the image, to resize the image, and/or to soften the edges or provide anti-aliasing processing to the image.

Feature and Data Sharing Between a Portable Electronic Device and a Connected Vehicle Control System Referring now to FIG. 7, a block diagram of portable device 116 and vehicle control system 106 for inheriting functions of portable device 116 and/or for providing functions to portable device 116 is shown, according to an exemplary embodiment. The functionality of portable device 116 and/or vehicle control system 106 can be varied. Some functionalities of portable device 116 may be complex to operate when driving. Other functionalities of portable device 116 may generate and/or display quickly changing or detailed images that would not be appropriate to operate while the vehicle is in motion. Further, some features of portable device 116 may not normally be available on vehicle control system 106 and vise versa. Portable device 116 and/or vehicle control system 106 may be configured to utilize features and data of the other device. Portable device 116 may include display 602 as described with reference to FIG. 6. In FIG. 7, portable device 116 is also shown to include various modules (e.g., hardware and/or software modules)/components 702-732.

World clock information 702 may be sent from portable device 116 to vehicle control system 106 for display, use in an emergency system, updating of vehicle clocks, or otherwise.

Navigational features, navigational databases, and/or map information 704 may be provided from portable device 116 to vehicle control system 106 for display and/or processing. Navigational features, navigational databases, and/or map information from vehicle control system 106 may also be provided to portable device 116 for display and/or further processing.

Human machine interface (HMI) elements 706 of portable device 116 may be used by HMI configuration engine 758 of vehicle control system 106 for display reproduction, voice recognition, and/or for transferring data between portable device 116 and vehicle control system 106.

A voice recognition engine 708 of portable device 116 may be used by voice recognition system 756 of vehicle control system 106 to provide additional features and extra processing capability to vehicle control system 106 and/or to the user's in-vehicle command and control experience.

Media decoding elements 710 provided on portable device 116 may be used to decode audio files stored on portable device 116 and/or vehicle control system 106. The decoded audio and/or a transformed data stream or file may be provided from portable device 116 to vehicle control system 106 for storage, further processing, and/or output via vehicle audio system 746.

Connectivity applications 712 of portable device 116 may be utilized by vehicle control system 106. For example, a TCP/IP stack, communications protocol modules, security software, decryption algorithms, browser software, or other communications or connectivity software may be utilized by vehicle control system 106 to complete vehicle control system communications tasks and/or to retrieve information (e.g., from another remote source or a remote server) for forwarding to vehicle control system 106.

A calendar application 714 of portable device 116 may be utilized by vehicle control system 106 to receive calendar data from portable electronic device memory and/or a remote source, to receive alerts, reminders, schedule information, calendar display information, a mechanism for accepting or rejecting meeting requests, or otherwise. According to various alternative embodiments, vehicle control system 106 may include a calendar feature and may be configured to synchronize data with calendar application 714, a database of portable device 116, and/or an remote calendaring data source (e.g., an enterprise server accessible via the Internet).

An E-Mail feature 716 of portable device 116 may be utilized by vehicle control system 106 to receive E-Mail text, to synchronize stored e-mail information, to reproduce an inbox view, to play back voice mails residing in an E-Mail inbox, to draft and send an E-Mail (e.g., using a voice typing and/or voice recognition feature of the vehicle), or otherwise.

A text messaging feature 718 of portable device 116 may be utilized by vehicle control system 106 to receive text messages, to send text messages, to reproduce an inbox view, to draft and send a text message (e.g., using the voice recognition feature of the vehicle), to synchronize text messages with text messages stored in vehicle memory or otherwise. According to an exemplary embodiment, text messages received by the portable electronic device are provided to a connected vehicle control system for display and/or audio output by the vehicle control system (e.g., and connected displays, audio systems, etc.).

A voice mail feature 720 of portable device 116 may be utilized by vehicle control system 106 to display or audibly provide an indication that a new message has arrived, the number of new messages, the number of undeleted messages, the number of saved messages, the contents of the voice mail (via audio and/or text via a speech to text module provided in the vehicle, etc.), or otherwise.

Web services 722 of portable device 116 may be utilized by vehicle control system 106 to provide web-based transmissions and/or receptions of information, to parse information, to display information, to provide access to Internet-based information, to provide access to applications on portable device 116, to provide access to hardware of portable device 116, or for other purposes.

Video services 724 of the portable device 116 may be utilized by vehicle control system 106 to provide video decoding and/or playback features to the vehicle. For example, while vehicle control system 106 may include provisions for playing a standard MPEG file, and video services 724 of portable electronic device 116 may include an updated codec and/or application for decoding a media file stored on portable device 116 or vehicle control system 106. Vehicle control system 106 may provide data (e.g., data files, streaming data) to portable device 116 for processing. Video services 724 and/or portable electronic device 116 may be configured to provide the results of such processing back to vehicle control system 106 for storage and/or output (e.g., display output, audio output).

A flash memory element 726 (or other memory element) of portable device 116 may be utilized by vehicle control system 106 and/or portable electronic device 116 to store media files, configuration files, and/or any other type of files or information. According to an exemplary embodiment, memory element 726 may be used to provide updates (e.g., application updates, firmware updates, etc.) to portable electronic device 116 and/or for vehicle control system 106.

Games 728 provided on portable device 116 may be provided to vehicle control system 106 and/or to a vehicle display 744 or vehicle audio system 746 thereof. Vehicle control system 106 may be configured to forward game information to a rear seat entertainment system, wireless headphones via a vehicle-mounted transmitter, or otherwise.

Home status information 730 available at portable device 116 may be forwarded to vehicle control system 106 for processing, display, and/or user alerts. For example, portable device 116 may be configured to receive an alert from a home security system. The alert may be forwarded from portable device 116 to vehicle control system 106 for display, processing, and/or audible indication. Further, commands generated at a vehicle user interface may be provided to portable device 116 for processing, execution, and/or forwarding commands or requests to the home security system.

Stock market information 732 or applications available on portable device 116 may be forwarded, retrieved, or otherwise communicated from portable device 116 to vehicle control system 106. According to an exemplary embodiment, requests for stock information may be generated by a vehicle user interface and/or vehicle control system and provided to the portable electronic device for processing and/or for retrieval by the portable electronic device (e.g., from a remote source). According to an exemplary embodiment, for example, a request for updated stock ticker information may be formed at the vehicle control system (e.g., by prompting for and receiving one or more ticker symbols). The vehicle control system can interface with an application on the portable electronic device for requesting and retrieving updated ticker information (e.g., price) from a remote source (e.g., an Internet source). The results can be processed by the portable electronic device (e.g., to generate a chart, percentage change, etc.) and provided to the vehicle control system from the portable electronic device for storage and/or display.

Referring still to FIG. 7, vehicle control system 106 is shown as communicably coupled to various vehicle components. For example, vehicle tactile controls 740 associated with vehicle control system 106 may be used to control portable device 116 activities and/or to make selections of display elements reproduced on vehicle display 744. A vehicle touch screen 742 may be used to provide touch screen features to portable device 116 or to send other control signals to the portable device 116. A vehicle microphone 744 may be used for detection and interpretation of vocal utterances. The utterances or information representing the utterances may then sent from vehicle control system 106 to portable device 116 for processing. In some exemplary embodiments, the utterances may be processed by the vehicle control system to generate requests or commands for providing to the portable electronic device for processing (e.g., by an application of the portable electronic device, for forwarding to a remote system from the portable electronic device, etc.). Vehicle display 108 and vehicle audio system 104 are also coupled to vehicle control system 106 (as described in FIGS. 4-5 or otherwise).

A GPS receiver 752 of vehicle control system 106 may be configured to send location and/or heading information to portable device 116 for use in one or more applications or for transmission to another remote source. According to an exemplary embodiment, a processing system 754 of vehicle control system 106 can be configured to receive subsystem information and to provide dead-reckoning processing to the location information received by GPS receiver 752 using the subsystem information.

A processing system 754 of vehicle control system 106 may be used to process information, files, or streams provided by portable device 116. Similarly, a processing system of portable device 116 may be configured to process information, files, streams, or signals provided from vehicle control system 106 to portable device 116. According to an exemplary embodiment, the processor (the processor of the vehicle control system or the portable electronic device) more suitable and/or available for processing certain elements or tasks may be used to process those elements or tasks. Processing system 754 may be similar to data processing system 122 of vehicle control system 106 as described in FIGS. 4-5.

A voice recognition system 756 (e.g., a system including various text and speech devices 134-138 as described in FIGS. 4-5) and/or human machine interface (HMI) configuration engine 758 provided with vehicle control system 106 may be used to provide control to portable device 116. HMI configuration engine 758 may be used to customize the graphical user interfaces or other interfaces (e.g., voice recognition interfaces, button functions, touch screen configuration, etc.).

Operational Mode Features

In situations where a "normal" display mode and/or menu mode of portable electronic device 116 is not desirable for display reproduction or otherwise, portable electronic device 116 may be configured to switch from a normal mode of operation to a "vehicle" mode of operation.

Figure 8:
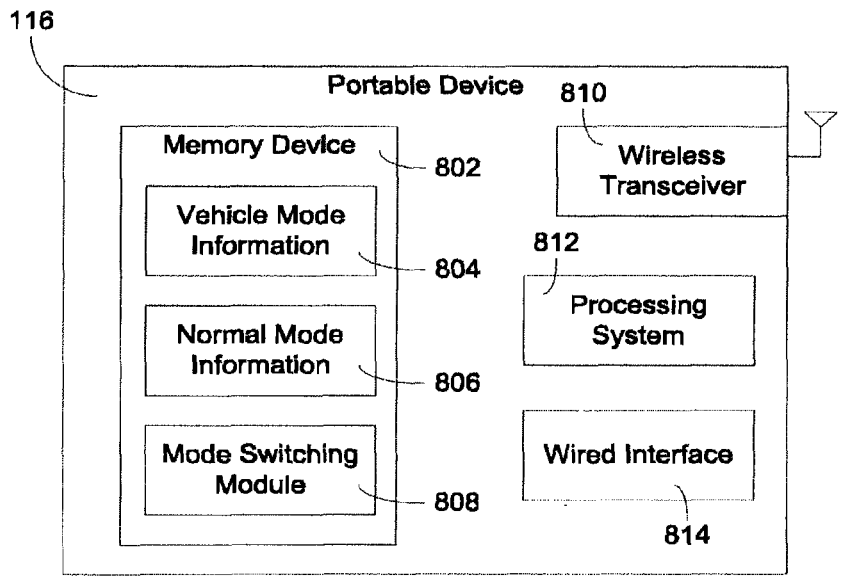
FIG. 8 is a detailed block diagram of a portable electronic device, according to an exemplary embodiment.

Referring to FIG. 8, a portable electronic device 116 is shown in detail, according to an exemplary embodiment. Portable electronic device 116 is shown to include a memory device 802, a wireless transceiver 810, a processing system 812, and a wired interface 814. Memory device 802 is shown to include "vehicle mode" information 804 (e.g., information relating to a vehicle mode of operation), normal mode information 806, and a mode switching module 808. Processing system 812 may be a general processing system configured to execute computer code, a specialized processing system, and/or a collection of circuitry for completing the activities described herein. Vehicle mode information 804 may include, relative to the normal mode of operation, parameters for a new GUI theme, a new GUI color scheme, new display driver settings, software elements configured to generate displays suitable for display reproduction, or otherwise. Vehicle mode information 804 may also include feature suppression commands or settings such that portable device 116 suppresses unsafe and/or complicated features or screens from use during a vehicle mode. Mode switching module 808 may be provided and may include computer code, scripts, or macros for switching from a normal mode of operation to a vehicle mode of operation. According to an exemplary embodiment, mode switching module 808 is a web service, application programming interface, or other server or service configured to receive a command, request, or other information from a vehicle control system; the receipt of which is processed and causes the portable electronic device to controllably switch from mode to mode or to enable/disable certain features. Portable device 116 may use wireless transceiver 810 and wired interface 814 for connecting wirelessly or via a wired connection, respectively, with a vehicle control system.

Figure 9:
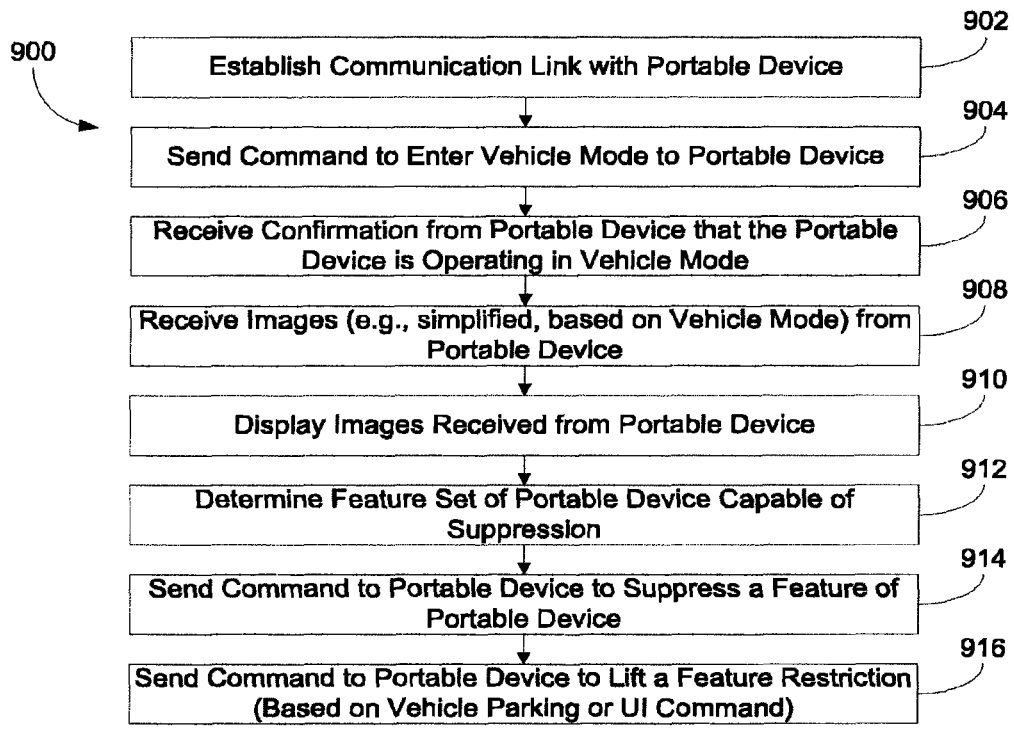
FIG. 9 is a flow chart of a vehicle control system process for interacting with a portable electronic device, according to an exemplary embodiment.

Referring also to FIG. 9, a vehicle control system process 900 for interacting with a portable device having vehicle mode features is shown, according to an exemplary embodiment. Process 900 includes establishing a communication link (wired or wireless) with a portable device (step 902). Process 900 further includes sending a command to enter a "vehicle mode" to the portable device (step 904). Any number of handshaking steps and/or querying steps may additionally take place. For example, the vehicle control system may query the portable device to determine if the portable device includes a "vehicle mode" feature or if a "vehicle mode" has been defined for the portable device that is connected. In response to the command, the portable device may enter a vehicle mode and send a confirmation message to the vehicle control system. The vehicle control system may be configured to receive a confirmation from the portable device that the portable device is operating in vehicle mode (step 906).

The receipt of confirmation information may trigger any number of activities, including, for example, display reproduction activities. According to an embodiment wherein the vehicle control system and the portable device utilize the vehicle mode for display reproduction activities, the vehicle control system may begin receiving simplified images (relative to those shown on the portable device during a normal mode) from the portable device (step 908). The received images may be displayed on one or more vehicle displays (step 910). During (or prior to entering) vehicle mode, the vehicle control system may be configured to determine a feature set of a portable device capable of suppression (step 912). For example, a portable device may include a gaming feature or a text messaging feature. These features may be suppressed during vehicle mode for any number of reasons. The portable device may have knowledge that these features may be suppressed (e.g., via a stored table or database) and may transmit relevant data to the vehicle control system upon request. Based on the suppressible feature information, the vehicle control system may send a command to the portable device to suppress a feature of the portable device (step 914). According to various exemplary embodiments, a command to enter "vehicle mode" or a specific vehicle operational mode (e.g., "driving at highway speeds," "driving in unsafe conditions," "driving in slippery conditions," "driving in the dark," "parked," or another driving mode of operation) may cause a portable device to suppress one or more number of features (e.g., voice feature restrictions may be selectively (or automatically via vehicle control system determination) lifted (step 916). According to an exemplary embodiment, the command provided to the portable electronic device from the vehicle control system includes a command to disable one or more of a local display of the portable electronic device, a text messaging capability of the portable electronic device, an e-mail capability of the portable electronic device, a web-browsing capability, and a media application (e.g., a photo application, a music application, a video application, a gaming application, etc.).

According to yet other exemplary embodiments, a processing circuit of the vehicle control system may further be configured to cause a vehicle audio system or a vehicle display system to prompt the user for whether a feature corresponding to the disabled portable electronic device feature should be enabled or replicated by the control system. The vehicle control system processing circuit may be configured to enable or replicate the feature based on received user input. Any vehicle control system component or subsystem may be used to enable or replicate the feature by the vehicle control system. For example, a vehicle display may be used to replicate a disabled portable electronic device display or a vehicle media player may be used to replicate a portable electronic device media player (in some embodiments, using media from the portable electronic device for playback via the vehicle audio system). If a text messaging capability is disabled on the portable electronic device based on a command received from the vehicle control system, the vehicle control system can prompt the user for whether the vehicle control system should enable a text-messaging application of the vehicle control system (e.g., using voice typing, steering wheel controls, or other vehicle user interface elements to enter the messages), and in some embodiments using the portable electronic device to transmit the text-messages to a remote source or to receive text messages for display on a vehicle display or for playback via a vehicle audio system. According to an exemplary embodiment, the vehicle control system and/or a processing circuit thereof may be configured to send a feature disabling command to the portable electronic device based on information such as a speed of the vehicle, accelerometer information, compass information, global positioning system information, and/or vehicle error codes from an engine control unit.

Figure 10:
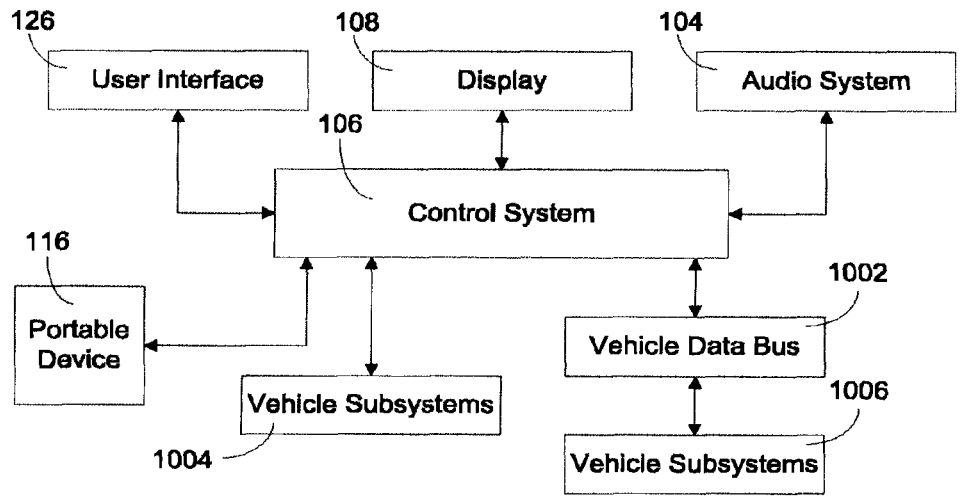
FIG. 10 is a block diagram of a vehicle control system coupled to a variety of components in a vehicle and a portable electronic device, according to an exemplary embodiment.

During "vehicle mode," "normal mode," or other switching activities, a vehicle control system may be configured with situational awareness logic for switching modes (or for conducting another portable device/vehicle control system activity) without direct user input. Referring to FIG. 10, vehicle control system 106 is shown. Vehicle control system 106 could use any number of logic processes to determine that the vehicle is in motion, in drive, or if another vehicular operational and/or situational states (e.g., traveling at a certain speed, encountering an emergency situation, whether the airbags were released, etc.). Through a connection to vehicle control system 106, portable device 116 could receive an indication that the vehicle is in a park mode, drive mode, or otherwise. Portable device 116 could then, after receiving the situational signal, change modes and/or change operational parameters. Vehicle control system 106 could also communicate information to the portable electronic device that causes the portable electronic device to dial 911 or another emergency number, send a text message reporting the emergency, send detailed data to a remote server regarding the emergency (e.g., vehicle location from a GPS system, the condition of the vehicle, dead reckoning information, etc.). A situational state or signal may be effected by any one or more of a user interface 126, a vehicle subsystem 1004 (e.g., an accelerometer, etc.) directly coupled to vehicle control system 106, a vehicle subsystem 1006 coupled to control system 106 via a vehicle data bus 1002, or otherwise. An indication of situation may be provided to vehicle display 108, vehicle audio system 104, and/or via a portable device display. Vehicle subsystems 1004, 1006 may include an engine controller, a wheel speed sensor, a transmission, a GPS receiver, a compass, a light sensor, a rain sensor, a seating sensor, an occupancy sensor, an oxygen sensor, an impact sensor, a speed sensor, an emergency system, an air bag system, a gyroscope, a breathalyzer, an accelerometer, an airbag sensor, an anti-lock brake sensor, a temperature sensor, a navigational system, or other suitable vehicle systems that may indicate a vehicle state (e.g., whether in drive, the speed of the vehicle, whether the vehicle has crashed, whether the vehicle has experienced an emergency condition, whether the vehicle is driving on a highway, whether the vehicle has cruise control engaged, etc.). The information (e.g., vehicle status information) communicated to the vehicle from vehicle subsystems can be received at an interface communicably coupling the subsystem to the vehicle control system and the vehicle control system (e.g., a processing circuit and a communications interface coupled thereto) may be configured to communicate the vehicle status information to a portable electronic device brought into the vehicle and/or to a remote source (e.g., via the portable electronic device or otherwise). According to some exemplary embodiments, vehicle status information may be formatted to be transmitted to a remote source from the portable electronic device, or may be transmitted to the portable electronic device with data for transmitting (e.g., a URL, an IP address, or another remote source identifier, etc.) the vehicle status information to the remote source from the portable electronic device.

Figure 11:
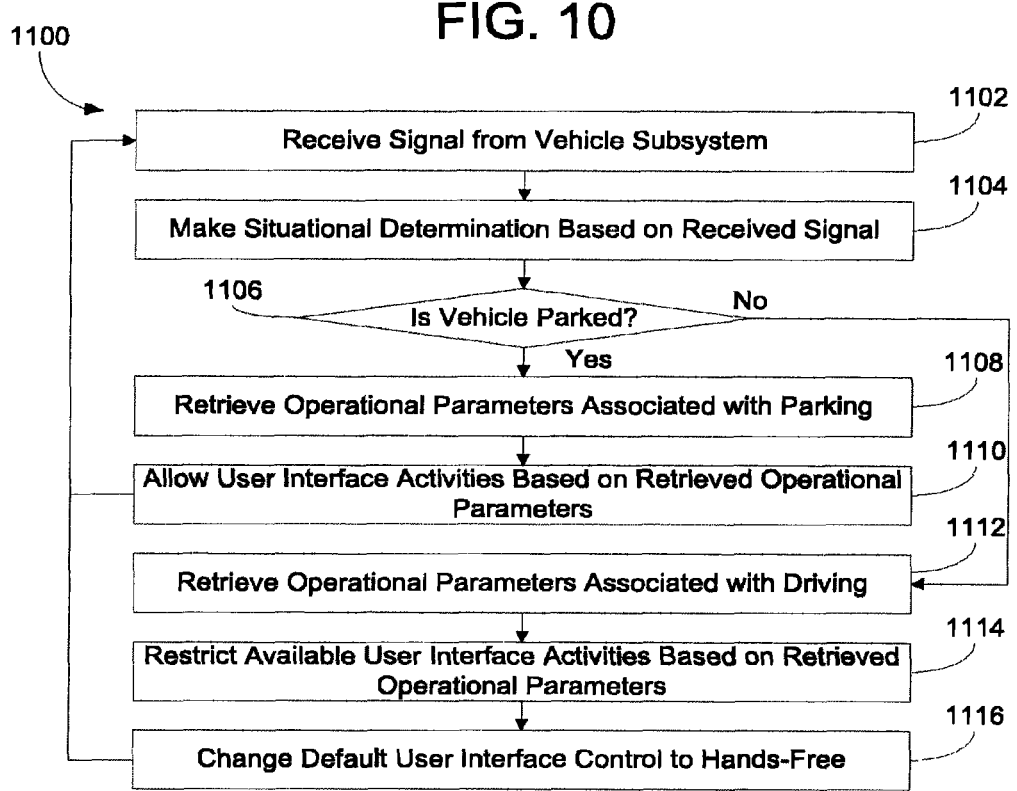
FIG. 11 is a flow chart of a process for providing situational awareness in a vehicle, according to an exemplary embodiment.

Referring to FIG. 11, a flow chart of a process 1100 for providing situational awareness-based activities in a vehicle is shown, according to an exemplary embodiment. Process 1100 is shown to include receiving a signal from a vehicle subsystem (step 1102). The process may include receiving one or more signals from multiple vehicle subsystems. Based on the signals and/or other indicators or logic, the system may be configured to make a situational determination (step 1104) (e.g., whether an emergency has occurred, whether the vehicle is traveling too fast for texting to occur, etc.). According to an exemplary embodiment, the vehicle control system determines whether the vehicle is parked or not (step 1106). If the vehicle is parked, the control system and/or the portable device may retrieve operational parameters associated with parking (step 1108). The retrieved operational parameters may include a command or setting to effect the allowance of user interface activities not available when the vehicle is moving (step 1110). If the vehicle is not parked, the vehicle control system and/or the portable device may retrieve operational parameters associated with driving (step 1112). If the vehicle is not parked, the vehicle control system and/or the portable device may effect the restriction of user interface activities based on retrieved operational parameters or otherwise (step 1114). A "not parked" determination may cause the portable to switch to one or more "vehicle" operational modes from a normal mode of operation. A determination that the vehicle is not parked may further change a default user interface control set to a control set configured to facilitate hands-free control and/or operation of the vehicle control system and/or the portable device (step 1116).

Inheriting Portable Device Features

Figure 12:
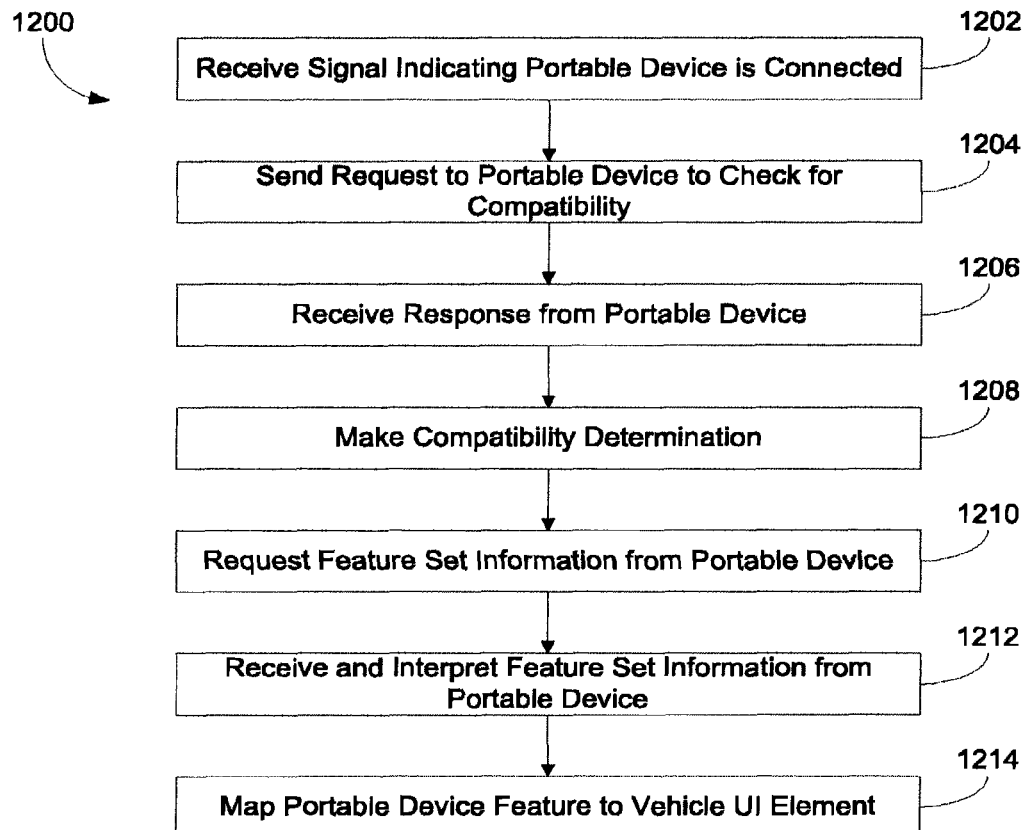
FIG. 12 is a flow chart of a process for a vehicle control system inheriting a feature of a portable device, according to an exemplary embodiment.

Referring now to FIG. 12, a flow chart of a process 1200 for inheriting a feature (e.g., processing feature) of a portable device is shown, according to an exemplary embodiment. Process 1200 may include receiving a signal indicating the portable device is connected (wirelessly or wired) or otherwise ready for functional communication (step 1202). A vehicle control system may send a request to the connected portable device to check for compatibility with a feature inheriting activity (step 1204). After the vehicle control system receives a response from the portable device (step 1206), the control system may be configured to make a compatibility determination (step 1208). The compatibility determination may affect which features the vehicle attempts to inherit from the portable device. The vehicle control system may then request feature set information from the portable device (step 1210). The feature set information may include one or more feature tables, text files listing available features, device type or class identifiers, or otherwise. The vehicle control system may be configured to receive and interpret the feature set information (step 1212) and to map a portable device feature to a vehicle user interface element (step 1214). For example, if the portable device includes a one-touch dialing feature, a return call button, a list N calls list, a dead reckoning feature, an emergency calling feature, or another desirable feature, the vehicle control system may map a routine or command for sending to the portable device to receiving a signal from a programmable button (e.g., on the steering wheel) or a programmable touch screen element.

Figure 13:
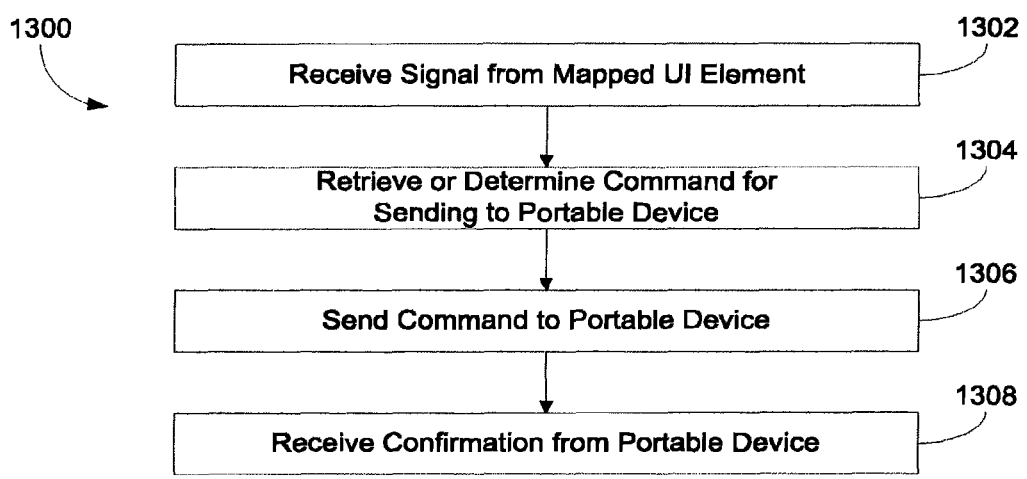
FIG. 13 is a flow chart of a process for a vehicle control system activity based on the programmed or "feature mapped" user interface element determined in the process of FIG. 12, according to an exemplary embodiment.

Referring now to FIG. 13, a flow chart of a process 1300 of a vehicle control system activity based on the programmed/mapped user interface element of step 1214 of process 1200 of FIG. 12 is shown, according to an exemplary embodiment. Process 1300 includes receiving a signal from a mapped user interface element (e.g., receiving a signal that a programmable button on the steering wheel has been pressed) (step 1302). In response to the signal, the vehicle control system may retrieve or otherwise determine the appropriate command or control signal (step 1304) for sending to the portable device (step 1306). The command or control signal may be configured to trigger or request the execution of the desired portable device function/feature. The vehicle control system may receive a confirmation signal from the portable device in response to the command (step 1308).

Figure 14:
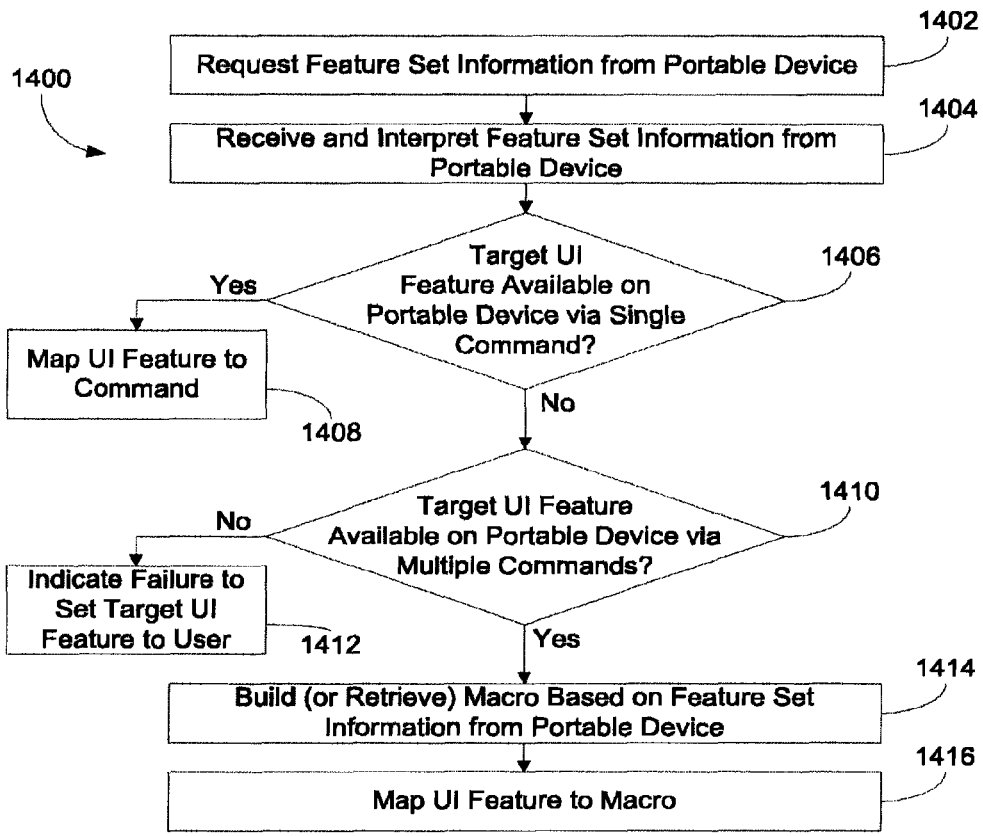
FIG. 14 is a flow chart of a process for configuring a vehicle control system to inherit a multiple-command feature from a portable electronic device, according to an exemplary embodiment.

Referring now to FIG. 14, a flow chart of a process 1400 for configuring a vehicle control system to inherit a multiple-command feature from a portable device is shown, according to an exemplary embodiment. A multiple-command feature may be a target user interface feature that is desired by the user. For example, a vehicle occupant may desire to display a recently called list on the vehicle display, but the display of the recently called list may require two commands at the portable device (e.g., a phone menu must be accessed followed by the selection of an item on the phone menu). The vehicle control system may request feature set information from the portable device (step 1402) and receive and interpret the information (step 1404). The feature set information received may indicate that the target user interface feature is available or not available on the portable device via multiple activities or a single command (step 1406). If so, the user interface feature may be mapped to a command (step 1408). The vehicle control system may parse or otherwise interpret the feature information. If the target user interface feature is only available on the device via multiple commands (step 1410), the in-vehicle control system may be configured to build (or retrieve from memory) a macro (e.g., script, table to be parsed, text file to be parsed, etc.) based on any number of processes and/or the feature set information from the portable device (step 1414). A vehicle user interface feature may then be mapped to the macro (step 1416). If the target user interface feature is not available via a single command or multiple commands, a failure to set a target user interface may be indicated to a user (step 1412).

Figure 15:
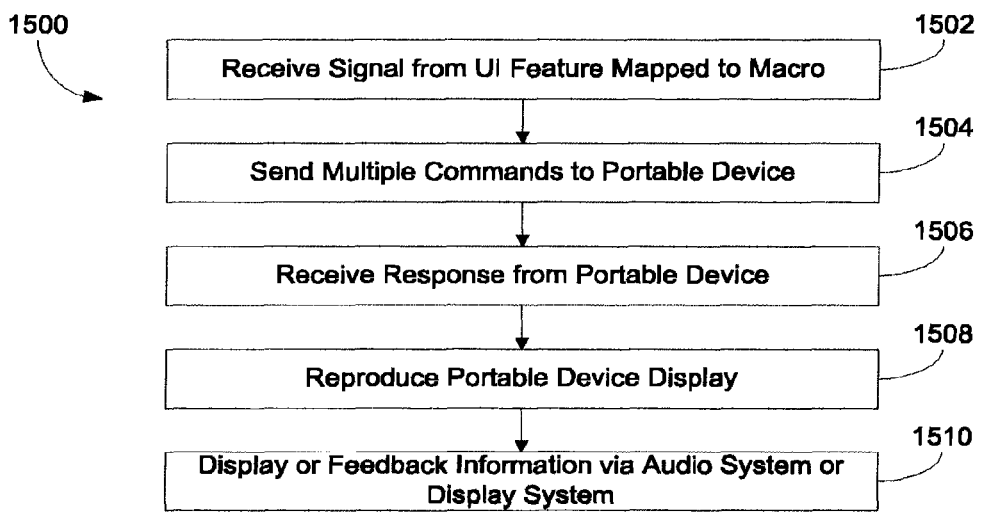
FIG. 15 is a flow chart of a process for a vehicle using the multiple-command feature of FIG. 14, according to an exemplary embodiment.

Referring now to FIG. 15, a flow chart of a process 1500 for a vehicle control system using the multiple-command feature of process 1400 of FIG. 14 is shown, according to an exemplary embodiment. Process 1500 includes receiving a signal from a UI feature mapped to a macro (step 1502), parsing or executing the macro, and sending multiple commands to a portable device based on the macro (step 1504). The vehicle control system may wait some period of time for a response from the portable device (e.g., prior to trying again or timing out) (step 1506). According to an exemplary embodiment, the vehicle control system will wait a period of time that it expects the portable device to respond within and then begin reproducing the display of the portable device (step 1508). This activity may help to provide a seamless transition from vehicle button press to the display of information relating to the button press. If information is sent to the vehicle control system based on the macro, the vehicle control system may send an audio signal to the vehicle audio system and/or a display signal to the vehicle display system (step 1510).

Voice Typing to the Portable Electronic Device Using a Vehicle Control System

Figure 16:
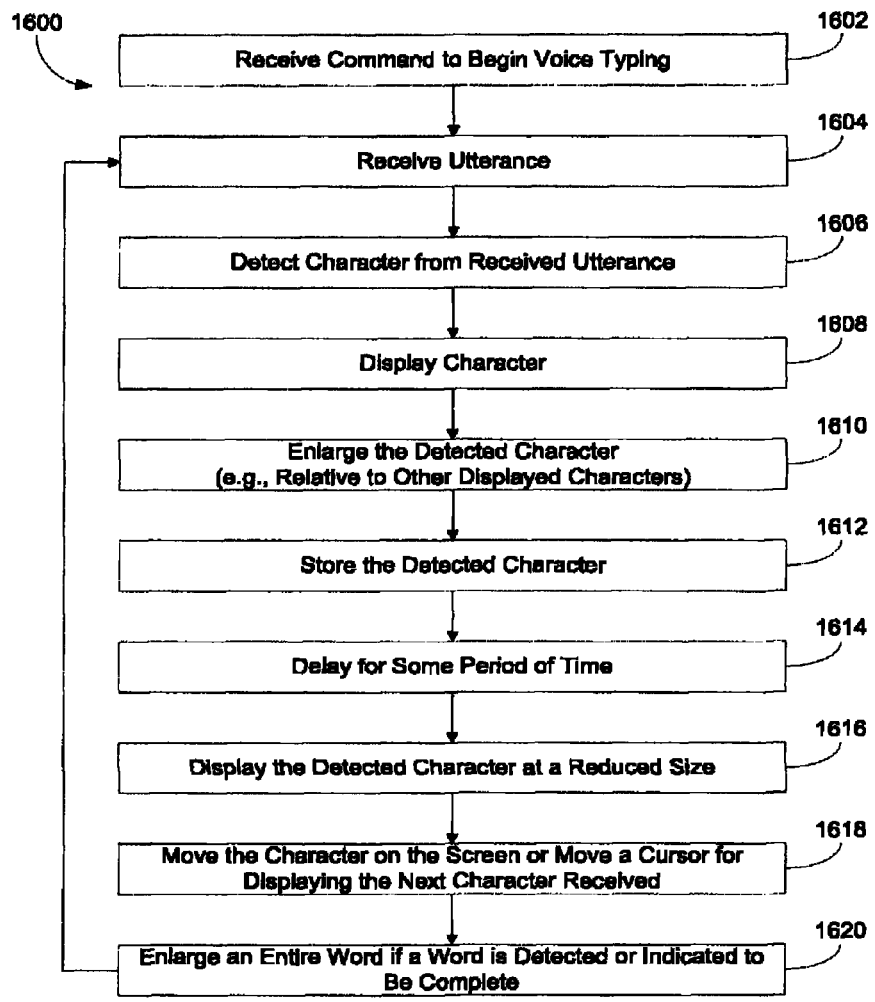
FIG. 16 is a flow chart of a process for providing a voice typing function to a vehicle control system and/or to a portable electronic device communicably coupled to a vehicle control system, according to an exemplary embodiment.

Referring now to FIG. 16, a flow chart of a process 1600 for providing a voice typing function in a vehicle is shown, according to an exemplary embodiment. Voice information could be spoken and understood by the vehicle control system and communicated to the portable electronic device via a wired or wireless communication connection. The vehicle control system may include an interface coupled to an audio input device mounted to the vehicle interior for receiving the voice information, according to an exemplary embodiment. Voice information may be single words, single phrases, sequences of spoken words, sequences of utterances and/or single letters, numbers, symbols (e.g., pound, star, dot, etc.), etc. According to an exemplary embodiment, the voice information may relate to a voice command. Process 1600 may be executed by a speech recognition module (e.g., speech recognition device 136) of the vehicle control system, according to an exemplary embodiment.

A dictation engine could be provided in or coupled to the vehicle control system. Results from the dictation engine may be sent to the portable electronic device whenever text may be entered and/or is expected by the portable electronic device. For example, if the portable electronic device is configured for web browsing and the user seeks to enter text into a text field on a browser screen, the dictation engine may be used to recognize spoken words to generate text that should be entered in the text field. Once a complete unit of text is recognized, the text may be forwarded to the portable electronic device for entry into the text field.

The text provided to the portable electronic device may be formatted by the processing circuit of the vehicle control system, according to an exemplary embodiment. The text may be formatted such that the text characters may be entered into a text field displayed on the portable electronic device or such that the portable electronic device provides the text characters to a text-messaging application running on the device. According to various exemplary embodiments, the format may be at least one of a WAP format, a WXML format, an HTML format, an XHTML format, and an XML format.

Process 1600 includes receiving a command to begin voice typing (step 1602). Process 1600 further include receiving a vocal utterance (or other voice information) at an interface (e.g., a microphone or other interface coupled to an audio input device) of the control system (step 1604). One or more characters (or other units of speech) may be detected by the control system from the received utterance (or a signal representing the utterance) (step 1606). The control system may be configured to display the recognized character or unit of speech on a display of the vehicle (step 1608). If the control system is receiving a string of text or other units of speech, the control system may be configured to enlarge a character (or other unit of speech) as the character is detected (step 1610). Enlarging a character may include magnifying the character and/or increasing the size of the character for display relative to adjacent characters. After recognition, a detected character may be stored in a memory device (step 1612). The control system may delay for some period of time (step 1614) before reducing the size of the character or otherwise displaying the detected character at a reduced size (step 1616). The control system may then move the character on the screen or move a cursor for displaying the next character received (step 1618). While character-by-character enlargement or magnification may be provided, an entire word or phrase may be enlarged or highlighted (e.g., bolded, underlined, etc.) if complete (step 1620). Process 1600 may further include displaying a keyboard image on a vehicle display and highlighting images on the keyboard image. Process 1600 may further include communicating the text characters to the portable electronic device in a format that causes the portable electronic device to provide the text characters to an application running on the portable electronic device (e.g., a text-messaging application, a calendaring application, a mobile commerce application, a web-browsing application, a gaming application, a navigation application, an e-mail application, a notes application, a to-do list application, and a media application such a music, movies, or photo application, etc.).

Referring more specifically to step 1616 of process 1600, according to an exemplary embodiment, the vehicle control system may include an interface for providing display information to an electronic display device (e.g., output display 108) mounted to the vehicle interior. The processing circuit of the vehicle control system is configured to enter a voice-typing mode operation in process 1600 and is configured to display text characters as shown in step 1616. According to an exemplary embodiment, during step 1616, a recently converted text may be magnified (i.e., a recently converted text character may be magnified or larger compared to other previous converted text characters already displayed in the electronic display device.

Navigation Using a Portable Electronic Device and Vehicle Control System

Figure 17:
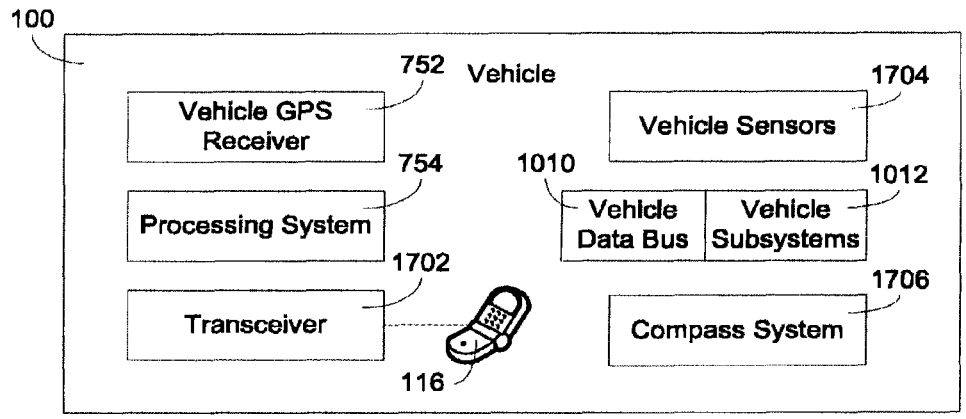
FIG. 17 is a block diagram of a vehicle including navigational features, according to an exemplary embodiment.
Figure 18:
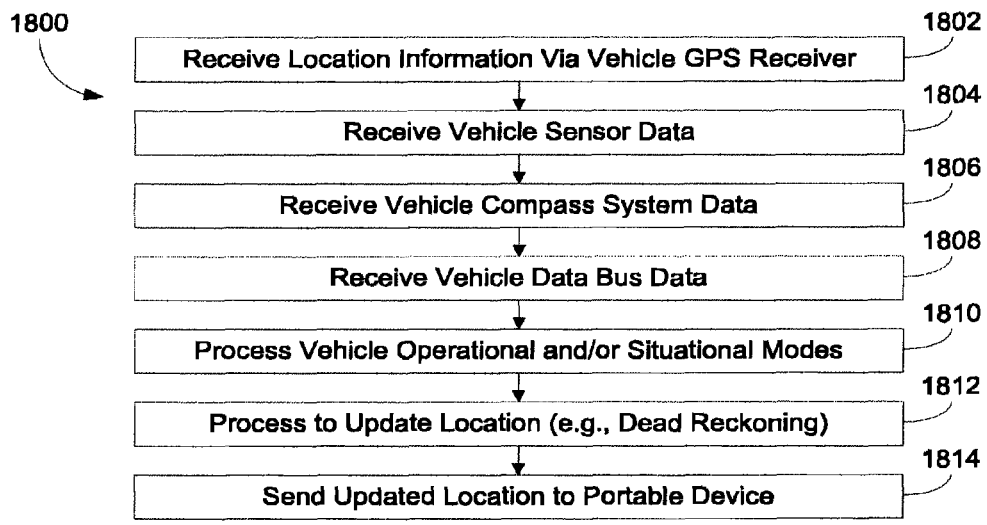
FIG. 18 is a flow chart of a process for a vehicle control system providing improved navigation activity, according to an exemplary embodiment.
Figure 19:
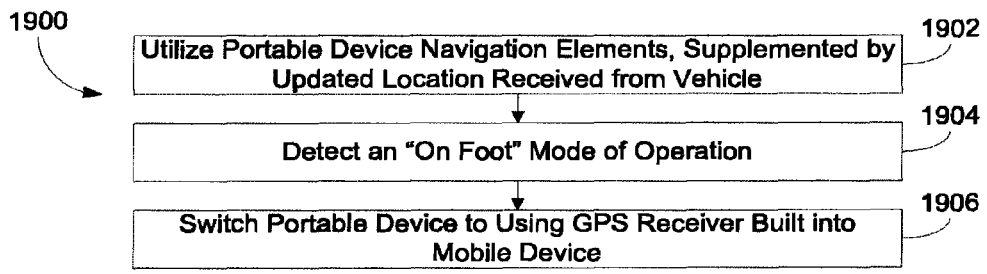
FIG. 19 is a flow chart of a process for a portable electronic device used in conjunction with the process of FIG. 18, according to an exemplary embodiment.

Referring now to FIGS. 17-19, systems and processes for providing improved navigational features in a vehicle using a portable electronic device are shown, according to various exemplary embodiments. Some functionalities of a portable device 1708 may utilize location coordinates or other location information. Some portable devices may include location coordinate electronics. Vehicle GPS receiver 752 and/or vehicle subsystem data (e.g., sensor data, compass data) received at the vehicle control system from subsystems 1012 (e.g., via data bus 1010) may be used to calculate a more precise location than the location processed by portable device 116. Processing system 754 of vehicle 100 may be configured to use transceiver 1702 to communicate location data to portable device 116 via a wired or wireless connection. Furthermore, commands or information pertaining to the vehicle's operational and/or situational modes could be communicated to portable device 116.

Processing system 754 may be used to receive the information from receiver 752, compass system 1706, and other vehicle subsystems 1012 via an input such as data bus 1010. Processing system 754 may use the information (e.g., subsystem information, position information) to calculate a precise vehicle location relative to the previously calculated or received position information. Processing system 754 may further utilize locationing information received from portable device 116 in the calculations.

Referring now to FIG. 18, flow chart a process 1800 for a vehicle control system providing improved navigation activity is shown, according to an exemplary embodiment. Process 1800 includes receiving location information via the vehicle GPS receiver 752 (step 1802). Location information may also be received via portable electronic device 116 and/or a GPS receiver operatively coupled (e.g., via USB) to the vehicle control system. The vehicle control system may receive vehicle sensor data directly from a vehicle sensor 1704 (step 1804), via a vehicle compass system 1706 (step 1806), via a vehicle data bus 1010 (step 1808), or otherwise. Other vehicle subsystems (e.g., cruise control system, engine ECU, transmission, etc.) may send data to the vehicle control system. An improved location determination may also be based on receiving and/or processing vehicle operational and/or situational modes (step 1810). For example, improved location determination logic may use the fact that a cruise control mode is set at a highway speed to help estimate the precise location of the vehicle in the near future. Process 1800 further includes any number of logical steps and/or considerations to provide improved/updated location information (e.g., dead reckoning) (step 1812). The updated location information may be sent to portable device 116 and used for display, sent to a vehicle display system for display, sent to a vehicle navigation system for further processing and/or display, or otherwise (step 1814).

Referring also to FIG. 19, a flow chart of a process 1900 for portable device 116 is shown, according to an exemplary embodiment. Process 1900 for portable device 116 may operate in conjunction with process 1800 for a vehicle control system or otherwise. Process 1900 includes utilizing portable device navigation elements (step 1902). Step 1902 may include receiving updated location information from vehicle 100 and supplementing the portable device 116's navigational activity based on the updated location information. Portable device 116 may at some point detect a disconnect with the vehicle control system, a separation from the location information provided by the vehicle control system, and/or otherwise detect an "on foot" mode of operation (e.g., detect that portable device 116 has left the vehicle) (step 1904). Once this detection has been made, portable device 116 may discontinue use and/or reliance on location information from the vehicle. Portable device 116 may switch from receiving location information from vehicle 100 to using location information received via the portable device 116's GPS receiver (step 1906).

According to an exemplary embodiment, portable electronic device 116 may be configured to transmit the position information to another remote source (e.g., an emergency response service, a concierge service) depending on the situational mode information of the vehicle control system (e.g., whether an emergency has occurred). According to another exemplary embodiment, the vehicle control system may be configured to provide portable device 116 with the position information including data for transmitting the position information to another remote device.

A Vehicle Control System Utilizing Two Possible Communications Devices

Figure 20:
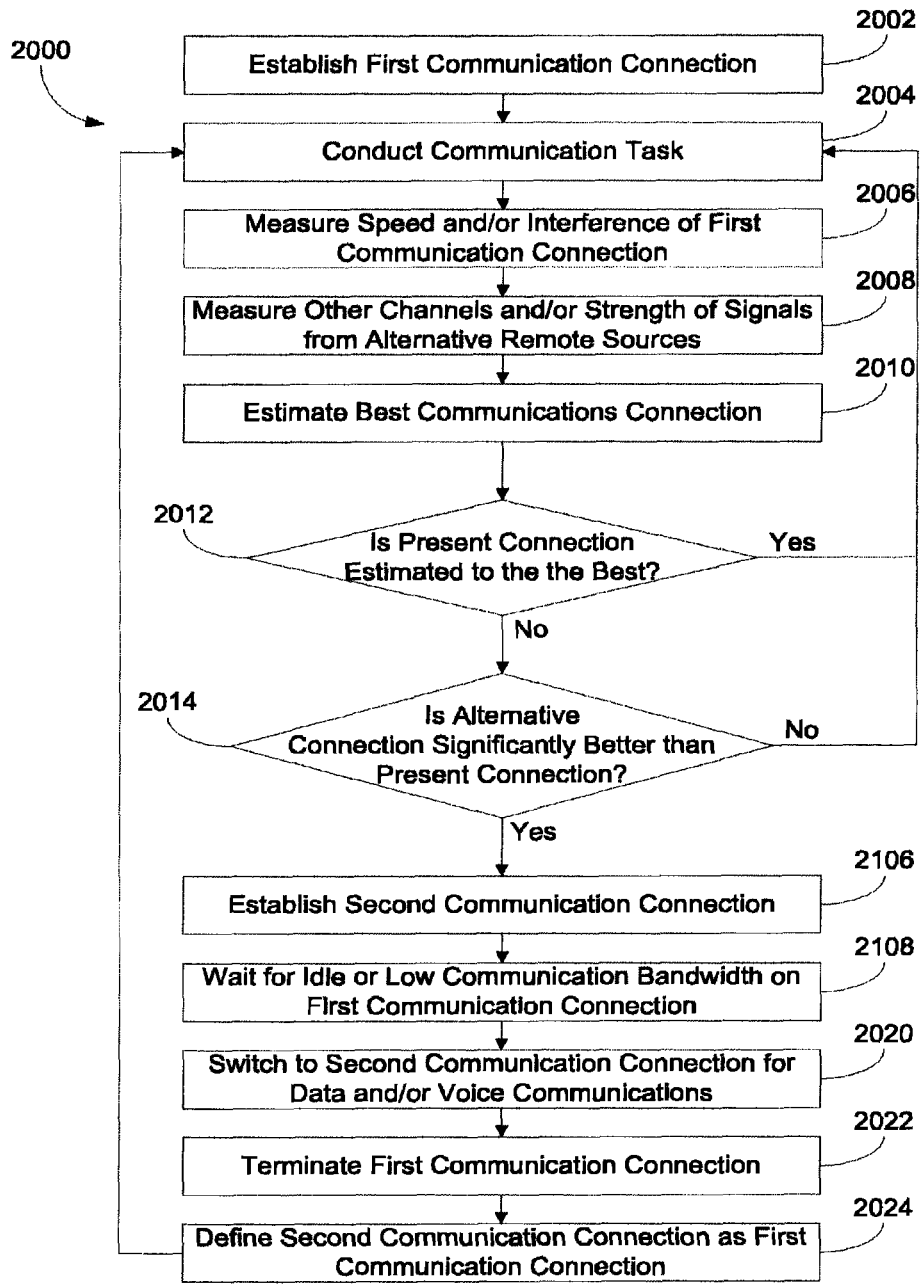
FIG. 20 is a flow chart of a process for utilizing two communication connections to provide for voice and/or data communications, according to an exemplary embodiment.

Referring now to FIG. 20, a flow chart of a process 2000 for utilizing two communication connections to provide for voice and/or data communications is shown, according to an exemplary embodiment. Process 2000 includes establishing a first communication connection (step 2002) and conducting a first communication task (step 2004). Process 2000 may include measuring the speed and/or interference of a first communication connection (step 2006). Process 2000 may further include measuring other channels and/or the strength of signals from alternative remote sources (step 2008). Process 2000 may further include estimating a best communications connection based on the measured information or other metric relating to the first communication connection or a potential communication connection (step 2010). Process 2000 further includes a determination or query regarding whether the present connection is estimated to be the best (step 2012). Process 2000 yet further includes determining whether an alternative connection is significantly better than the present connection (step 2014). If the present connection is estimated to be the best or if the alternative connection is not significantly better than the present connection, the communication system may continue operating via the first communication connection and conducting communication tasks and return to step 2004. If an alternative connection is significantly better than the present connection, the control system may establish a second communication connection (step 2016). The system may then wait for idle or low communication bandwidth on the first communication connection (step 2018) prior to switching to a second communication connection for data and/or voice communications (step 2020). The system may then terminate the first communication connection (step 2022). A process of the system may then define the second communication connection as the first communication connection and proceed with conducting communication tasks (step 2024).

Figure 21:
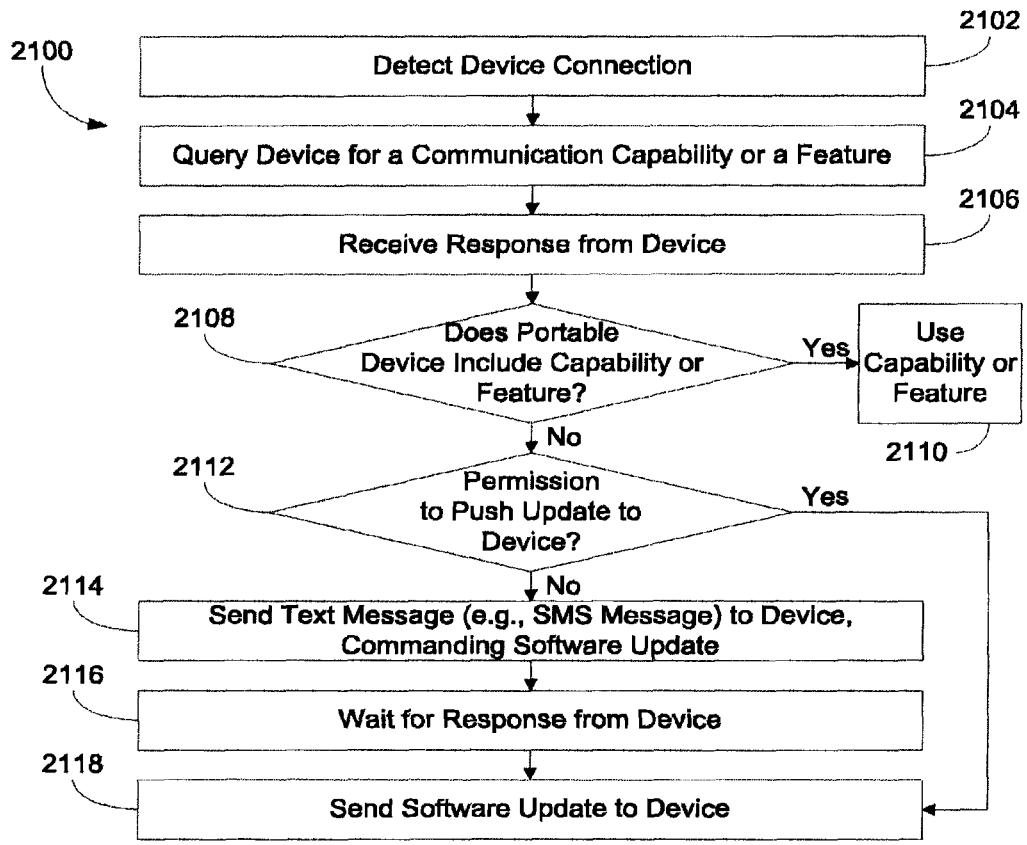
FIG. 21 is a flow chart of a process for generating a text message to trigger an update, according to an exemplary embodiment.

Generating Text Messages for Updates Between Portable Device and Vehicle Control System Referring now to FIG. 21, a flow chart of a process 2100 for generating a text message to trigger an update is shown, according to an exemplary embodiment. Process 2100 includes detecting a device connection (step 2102). Once a connection is detected, the system may query a portable device for a communication capability or feature (e.g., display reproduction capabilities, voice recognition capabilities, navigation capabilities, hands-free communication capabilities, text-messaging capabilities, e-mailing capabilities, Internet capabilities, mobile-commerce capabilities, media capabilities, macro capabilities, feature replication capabilities, dead reckoning capabilities, emergency capabilities, processing capabilities, etc.) (step 2104). The system may then receive a response from the device (step 2106) and the system may determine whether the portable device includes the capability or feature (step 2108). If the portable electronic device includes the capability or feature, the control system may use the capability or feature (step 2110). The vehicle control system may also check for permission to push an update (or a new software element) to the device (step 2112). If permission is available, the control system may push or otherwise send (e.g., via a request followed by a transmission) a software update to the portable device (step 2118). If permission is not available (or if further confirmation is desirable), the vehicle control system may send a text message (e.g., SMS message) to the portable device, the text message representing or otherwise configured to request a software update (step 2114). The control system may then wait for a response from the device (indicating permission or otherwise) (step 2116) prior to sending or pushing the software update to the device (step 2118). The software sent or pushed to the portable device may include application software, navigation software, codec software, device drivers, operating system updates, communication system updates, add-on modules, or otherwise. According to an exemplary embodiment, the vehicle control system and/or the portable electronic device can trigger updates using other than text messaging information (e.g., via a formatted request to an update application running on the portable electronic device). Further, in step 2108, the decision step as to whether the portable device includes the capability or feature may include a check to determine whether the portable electronic device includes the latest version of the software for conducting or supporting the capability or feature. If the portable electronic device does not include the latest version of the software for conducting or supporting the capability or feature, the vehicle control system can determine that it should update the portable electronic device with the latest version of the software. According to various exemplary embodiments, in addition to (or instead of) updating the portable electronic device, processing circuitry of the vehicle control system may be configured to determine whether an update is available for the processing circuitry and/or for another vehicle subsystem. The vehicle control system processing circuitry may be configured to request the update from a remote source via the portable electronic device, to receive the update via an interface communicably coupling the portable electronic device and the vehicle control system (e.g., a wired interface, a wireless interface), and to process or install the update.

Figure 22:
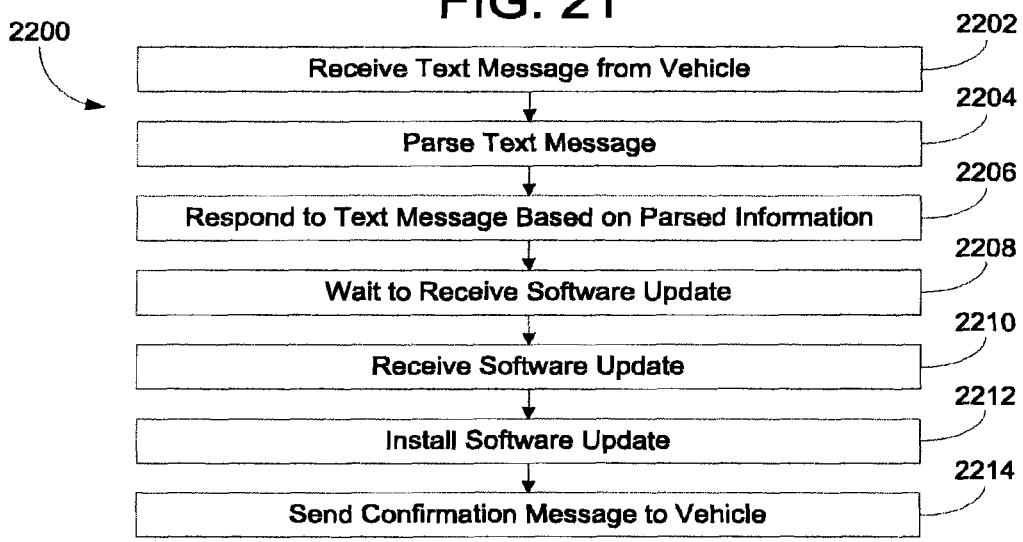
FIG. 22 is a flow chart of a process for a portable device receiving the text message generated by the process of FIG. 21, according to an exemplary embodiment.

Referring now to FIG. 22, a flow chart of a portable electronic device process 2200 for receiving a text message (e.g., the text message generated by process 2100 of FIG. 21) to trigger an update of the portable electronic device is shown, according to an exemplary embodiment. Process 2200 includes receiving a text message from the vehicle (step 2202). Process 2200 further includes parsing the text message (step 2204). The parsed information may include, for example, a name, number, and message field. The fields may be used to instruct the portable device which number to dial or where to send confirmation (e.g, e-mail address, Bluetooth identifier, IP address, network address, etc.). The process further includes responding to the text message based on the parsed information (step 2206). The response may include a request to send an update, identifying information, and/or a confirmation to send. The portable device may then wait to receive the software update (step 2208), receive the software update (step 2210), install the software update (step 2212), and/or send an additional confirmation message to the vehicle (step 2214).

Figure 23:
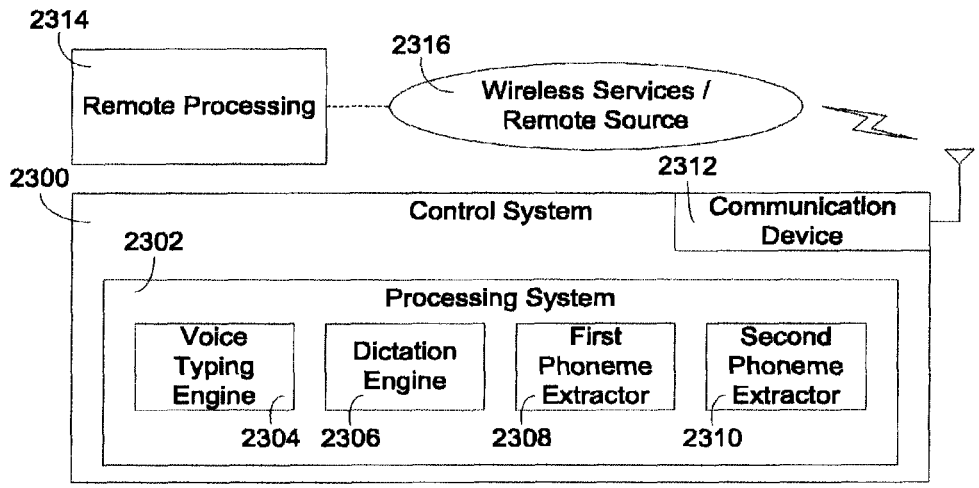
FIG. 23 is a block diagram of a system for providing in-vehicle voice processing assisted by a remote processing system, according to an exemplary embodiment.

Voice Processing Using a Portable Electronic Device and a Vehicle Control System Referring now to FIG. 23, a block diagram of a system for providing remote voice processing is shown, according to an exemplary embodiment. Vehicle control system 106 is shown to include communication device 120 and processing system 754 as described in the disclosure. Processing system 754 includes a voice typing engine 2302, a dictation engine 2304, a first phoneme extractor 2306, and a second phoneme extractor 2308. According to various exemplary embodiments, different parts of speech may be extracted by the extractors of vehicle control system 106. Vehicle control system 106 may generally be configured to utilize voice typing engine 2302, dictation engine 2304, and/or phoneme extractors 2306, 2308 until vehicle control system 106 determines that a remote processing system 2314 should assist or handle the extraction. First phoneme extractor 2306 may be a fast phoneme extractor, configured for reduced complexity but relatively high speed. Second phoneme extractor 2308 may be a slow phoneme extractor configured for increased accuracy and extraction capability but reduced speed.

Figure 24:
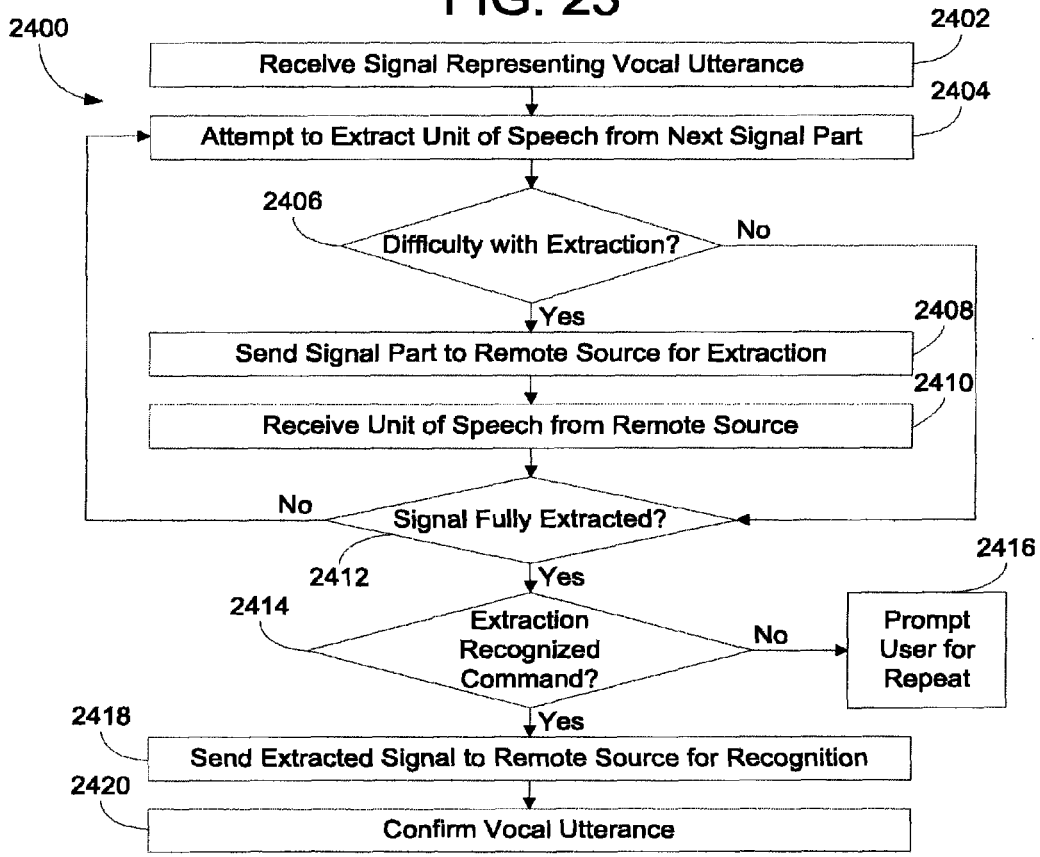
FIG. 24 is a flow chart of a process for providing in-vehicle voice processing assisted by a remote processing system, according to an exemplary embodiment.

Referring also to FIG. 24, a flow chart of a process 2400 for off-board part of speech extraction and/or voice recognition is shown, according to an exemplary embodiment. Process 2400 is shown to include the step of receiving a signal representing a vocal utterance (e.g., voice information) (step 2402). Process 2400 is further shown to include attempting to extract a unit of speech from the next (or first) signal part (e.g., a microphone signal, a microphone signal part) (step 2404). If vehicle control system 106 experiences difficulty with the extraction (step 2406), the signal part may be sent to a wireless service/remote source 2316 for extraction (step 2408). After wireless service/remote source 2316 has completed the extraction, an extracted unit of speech may be received from wireless service/remote source 2316 (step 2410). If vehicle control system 106 determines that the signal has been fully extracted (step 2412), system 106 may then determine whether the extraction is a recognized command (step 2414). If the extraction is not a recognized command, the system may prompt the user for a repeat (step 2416). If the extraction is a recognized command, system 106 may send the extracted signal to wireless service/remote source 2316 for further recognition or processing (step 2418). System 106 may confirm a vocal utterance once a word, phrase, signal part, sentence, or otherwise has been extracted (step 2420). Alternatively (or additionally), system 106 may confirm a vocal utterance based on brief processing or no processing, allowing the user to hear how system 106 detected the user's utterance. Remote processing may be completed via the portable device in the car, a remote processing station attached to the wireless service via the portable device, or otherwise. Further, even if a control system is not experiencing difficulty with extraction, some voice typing, dictation, or extraction tasks may be sent to a portable device or other remote processing station.

Various Exemplary Vehicle Control System Embodiments and Processes

Referring to FIGS. 25-30, various vehicle and vehicle control system embodiments are illustrated that may be used with various of the systems and methods of the present disclosure.

Figure 25:
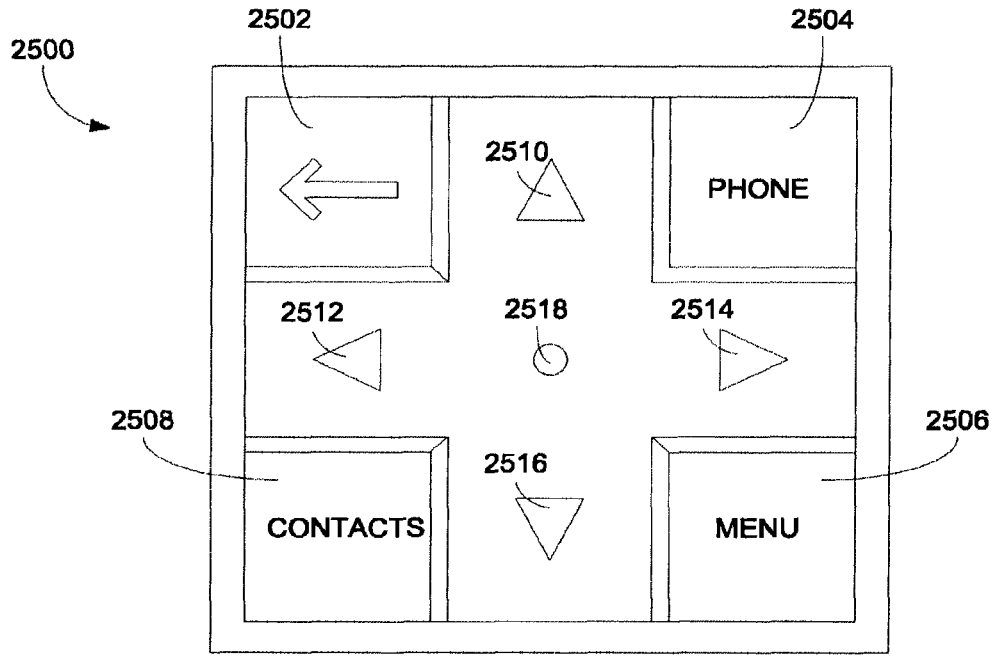
FIG. 25 is a diagram of a control for mounting to a vehicle interior element or for integrating with a vehicle interior element, according to an exemplary embodiment.

Referring to FIG. 25, an exemplary control for mounting to a vehicle interior element or for integrating with a vehicle interior element (e.g., a steering wheel) is shown, according to an exemplary embodiment. In the embodiment of FIG. 25, he control is shown to be a directional pad 2500, allowing the user to press an up 2510, left 2512, right 2514, and down 2516 portion of the pad. The control may also be configured for pressing in on the center 2518 of the pad. At the corners of directional pad 2500 might be provided one or more programmable buttons 2502-2508. Buttons 2502-2508 may have default settings. For example, the left arrow in the upper left corner 2502 may correspond to a "back" command, a "phone" button 2504 may correspond to a phone or hands-free feature or menu, a "menu" button 2506 may correspond to a home or root menu activity, and a "contacts" button 2508 may trigger a contacts menu or the display of contacts. It should be noted that button elements 2502-2508 may be programmed to features or macros of a connected portable device. If a new portable electronic device is brought into the vehicle and connected, the vehicle control system may be configured to automatically map one or more elements of control pad 2500 to portable device commands, features, or macros. Profile information stored in a memory device of the vehicle control system may be accessed for each connected portable electronic device, the profile information used by the vehicle control system to program one or more control elements.

Figure 26:
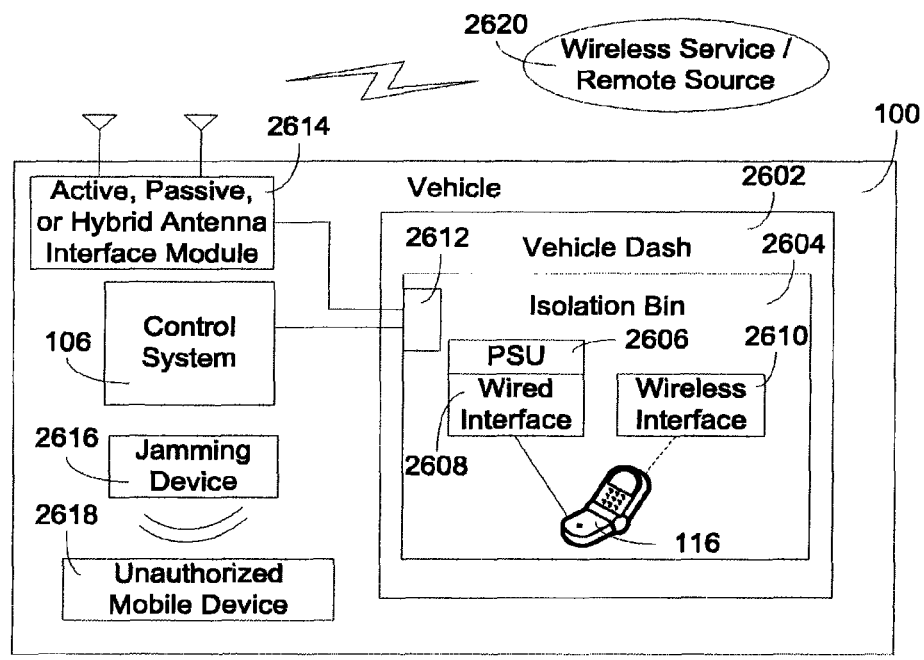
FIG. 26 is a block diagram of a vehicle including an isolation bin for a portable electronic device, according to an exemplary embodiment.

Referring now to FIG. 26, a block diagram of a vehicle communications system is shown, according to an exemplary embodiment. Government laws have been enacted to restrict use of handsets in vehicles. One method to assist adherence to these rules would be to install systems/components within the vehicle that interfere with and/or otherwise degrade the performance of certain handset functions to an extent that effectively renders them unstable. Some vehicles make handset use and communications difficult from within the interior of the vehicle. This may be due to degradation of the wireless signals to and from the handset resulting from vehicle structural materials and/or materials embedded in the vehicle glass that interfere with and/or otherwise negatively impact the signal characteristics. One or more isolation bins 2604 where a portable device 116 may be placed within vehicle 100 could be designed with equipment to avoid signal paths subject to this type of signal degradation. These bins 2604 could have the additional feature to restrict wireless signals that would otherwise contribute to signal degradation from reaching the handset (e.g., bin 2604 could be shielded). Bin 2604 may be located at a vehicle dash 2602 location or otherwise. Bin 2604 may totally enclose portable device 116 (e.g., may be closed) or bin 2604 may be permanently open on one or more sides. Isolation bin 2604 may further include be located adjacent a power supply unit (PSU) 2606, a wired interface 2608, and/or a wireless interface 2610. PSU 2606 may provide a power source for isolation bin 2604 and interfaces 2608, 2610 may be configured to connect to portable electronic device 116. Isolation bin 2604 may further include an interface 2612 for coupling to an active, passive, or hybrid antenna module 2614 mounted to the vehicle. Isolation bin 2604 may be coupled to vehicle control system 106 and portable device 116 may communicate with vehicle control system 106 via the operative coupling between bin 2604 and vehicle control system 106. Vehicle 100 having bin 2604 may also include a jamming device 2616 configured to jam the signal of one or more unauthorized mobile devices 2618. Antenna module 2614 may facilitate improved communications between portable device 116 and a wireless service/remote source 2620.

Referring to FIGS. 27-30, various embodiments for a vehicle control system connecting via a USB interface to various remote sources are shown.

Figure 27:
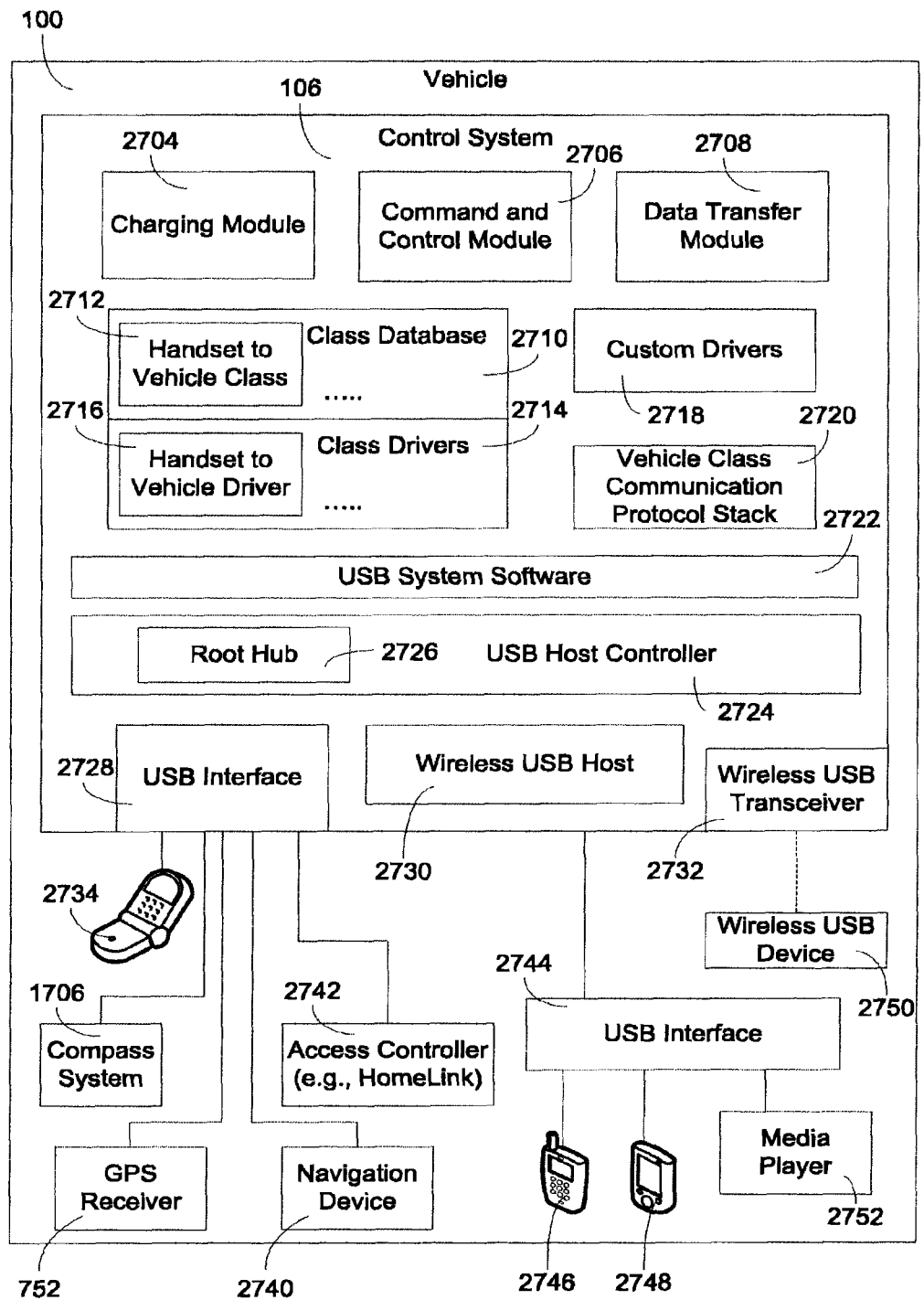
FIG. 27 is a block diagram of a vehicle control system including components for universal serial bus (USB) connectivity with a portable electronic device brought into the vehicle, according to an exemplary embodiment.

Referring now to FIG. 27, a detailed block diagram of vehicle control system 106 is shown, according to an exemplary embodiment. Generally, a USB connector or interface 2728, 2744 is provided within vehicle 100. The USB interface may be embedded in vehicle control system 106 (interface 2728) or may be coupled to vehicle control system 106 (interface 2744). Any past, present, or future USB protocol, specification, and/or hardware standard may be utilized (e.g., USB 2.0, USB micro connectors, USB mini connectors, etc.). USB interface 2728, 2744 may facilitate operative connection of a mobile phone 2734, a compass system 1706, a GPS receiver 752, another navigation device 2740, an access controller 2742 (e.g., a HomeLink® product sold by Johnson Controls, Inc.), a PDA 2746, a media player 2752, a satellite radio, a USB microphone, a wireless USB device 2750, or another portable device that may be brought into vehicle 100 and configured to communicate via USB connection (either via USB interfaces 2728, 2744, or via a wireless USB transceiver 2732 embedded in vehicle control system 106). Vehicle control system 106 may use the USB interface 2728 and/or features for charging, command and control, and/or data transfer. The USB specification includes standards for device classes. Vehicle control system 106 could be configured to support all USB specification device classes. Vehicle control system 106 could be classified as an embedded host, a host, a client, or otherwise. A handset-to-vehicle class might be provided and utilized by vehicle control system 106. Also, a vehicle class might be provided and utilized by a portable device. A vehicle or handset-to-vehicle class might include a number of attributes for facilitating vehicle control system 106 to portable device communications. For example a button configuration attribute may be defined with possible values including characteristics of the button configuration available on vehicle 100 and/or the portable device (e.g., the number of buttons, the type (d-pad), type+ button number, etc.). A display reproduction attribute may be defined with possible values including an indication as to whether vehicle 100 or the portable device is compatible with display reproduction activities (e.g., full display, partial display, not capable, etc.). Similarly, a display reproduction resolution attribute and a display reproduction area attribute could be defined in vehicle 100 or handset-to-vehicle USB device classes so that communicating devices are may be aware of the capabilities and parameters of the connected system via some standard mechanism. A vehicle voice recognition capability attribute may also be defined. The voice recognition (VR) capability attribute may include possible values such as "Full VR Capable," "Partial VR Capable," "Phoneme Extraction Capable," "Number Recognition Capable," etc. It should be noted that one or more binary, hexadecimal, or otherwise formatted code may represent one or more of the possible values for any of the aforementioned attributes.

Referring further to FIG. 27, a class database 2710 and/or class driver 2714 set included on control system 106 may include information and/or drivers relating to the handset-to-vehicle class 2712 and/or handset to vehicle driver 2716. Custom drivers 2718 may alternatively (or additionally) be provided for a connected USB device. A vehicle class communication protocol stack 2720 may be provided on the vehicle. Stack 2720 may include activities that facilitate car-system specific communications and/or display reproduction communications. Control system 106 may further include a charging module 2704, a command and control module 2706, and a data transfer module 2708. Modules 2704-2708 may include hardware and/or software elements configured to facilitate charging, command and control, and/or data transfer features relating to USB devices. A wireless USB host 2730 and wireless USB transceiver 2732 may be provided with or instead of a wired USB interface 2728. Control system 106 may include a USB host controller 2724, a root hub 2726 element, USB system software 2722, and/or any other processing element, memory, drivers, hardware circuitry, and/or software circuitry configured to facilitate operative vehicle to portable device communications via a USB connection.

Figure 28:
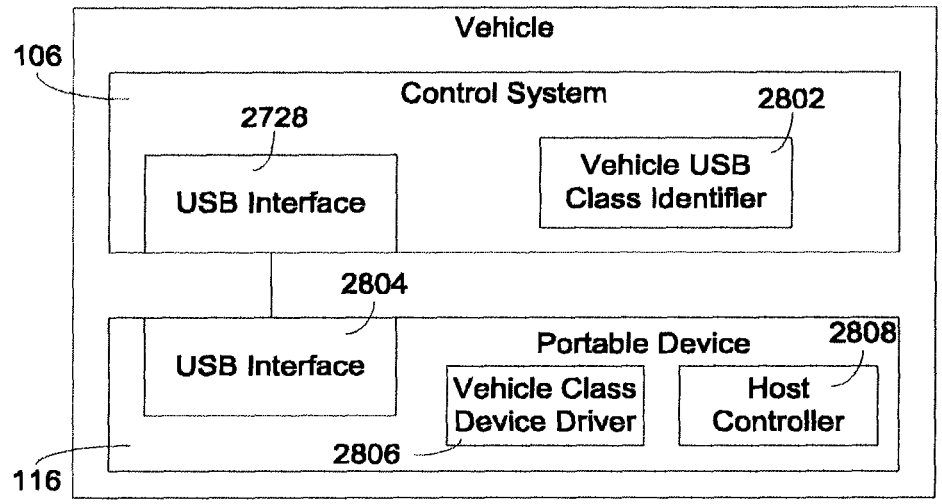
FIG. 28 is a block diagram of another vehicle control system including USB connectivity features, according to an exemplary embodiment.

Referring now to FIG. 28, vehicle control system 106 having USB interface 2728 is shown, according to an exemplary embodiment. USB interface 2728 is shown coupled to a USB interface 2804 of portable device 116. Vehicle control system 106 may include a vehicle USB class identifier 2802 for communicating to portable device 116. Portable device 116 is shown to include a "vehicle class" device driver 2806 and a host controller 2808. Advantageously, this may allow vehicle control system 106 and/or portable device 116 to communicate according to known attributes, common device drivers, common communication protocols, and the like. For example, a "vehicle class" device may include a number of attributes and methods specific to vehicle data or vehicle features.

Figure 29:
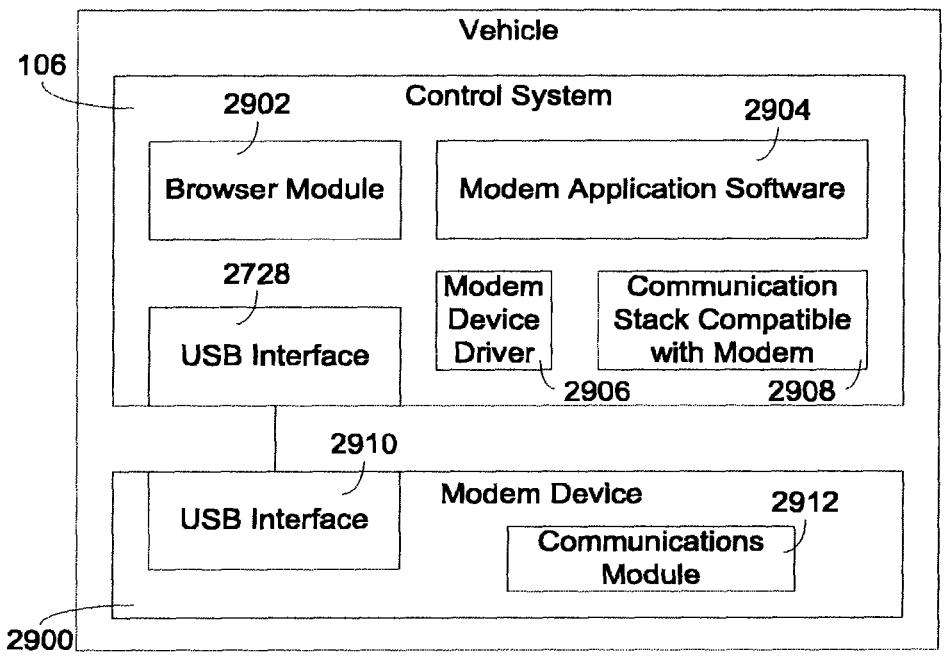
FIG. 29 is a block diagram of a vehicle control system configured to connect to and utilize a USB modem device, according to an exemplary embodiment.

Referring now to FIG. 29, a block diagram of vehicle control system 106 is shown, according to an exemplary embodiment. Vehicle control system 106 is shown coupled to a modem device 2900 via a USB connection (e.g., via USB interfaces 2728, 2910). Vehicle control system 106 may be configured to communicate with a wireless service and/or a remote source via communications module 2912 of USB modem 2900. Vehicle control system 106 is shown to include a browser module 2902, modem application software 2904, a modem device driver 2906, and a communication stack 2908 compatible with modem 2900. Vehicle control system 106 may use USB modem 2900 and browser module 2902 for web browsing activities or other communications activities. Advantageously, USB modem 2900 may be provided for different and/or upgraded communications without changing mobile phones or changing an embedded phone of the vehicle. USB modem 2900 may be any USB modem of the past, present, or future including, for example a GSM modem, a CDMA modem, a 3G modem, a GPRS modem, a UMTS modem, an HSDPA modem, etc.

Figure 30:
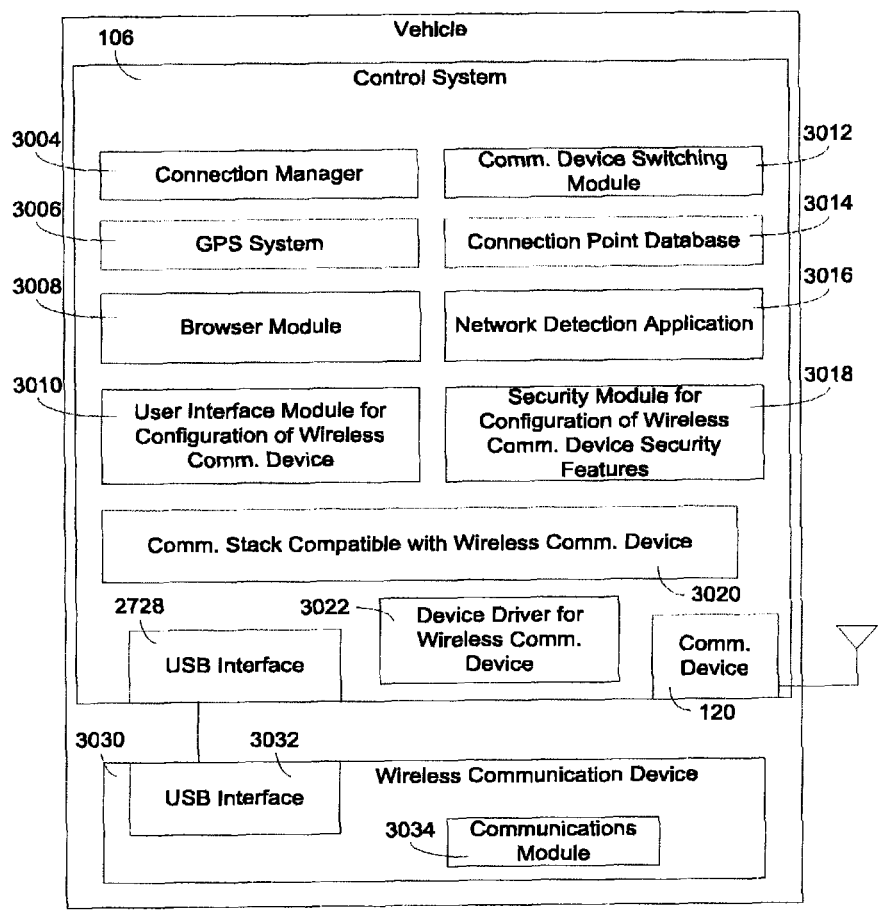
FIG. 30 is a block diagram of a vehicle control system for communicating with a wireless service or a remote source via a USB-connected wireless communication device (e.g., a USB WiFi transceiver), according to an exemplary embodiment.

Referring now to FIG. 30, vehicle control system 106 for communicating with a wireless service or a remote source via a USB-connected wireless communication device 3030 is shown, according to an exemplary embodiment. According to an exemplary embodiment, wireless communication device 3030 is a WiFi device or a WiMax device. Control system 106 is shown to include a connection point (e.g., WiFi "hot spot") database 3014. Connection point database 3014 may be used to store information regarding the location of areas within which or near which wireless communication device 3030 is estimated to be able to operatively connect to a network. GPS system 3006 may use database 3014 to display potential areas for connectivity to a user. GPS system 3006 may be used to calculate a route to the potential area for connectivity based on connection point database 3014. A network detection application 3016 may alternatively or additionally be provided to control system 106. Network detection application 3016 may be configured to use wireless communication device 3030 to detect available networks regardless of whether wireless communication device 3030 is already connected to another network.

Referring still to FIG. 30, control system 106 includes a connection manager 3004, according to an exemplary embodiment. Connection manager 3004 may be a logic module (e.g., hardware circuitry configured to execute computer code) configured to provide an operative communication connection whenever possible from a vehicle to a wireless service and/or remote source. Connection manager 3004 may be configured to switch between communicating using wireless communication device 3030 and communicating using on a second communication device embedded (or otherwise coupled to) control system 106. A communication device switching module 3012 may be used to switch from a first communication device to a second communication device during voice and/or data communications without revealing the switch to the user. Alternatively, the switch may be revealed to the user but occurs automatically so that the user need not manually command control system 106 to connect or reconnect via the one or more devices. A user interface module 3010 for the configuration of wireless communication device 3030 may be provided in control system 106. User interface module 3010 may present the user with fields, options, or available networks for configuring wireless communication device 3030. Control system 106 further includes a security module 3018 for configuration of wireless communication device 3030 security features. Security module 3018 may be configured to negotiate encryption features, to conduct encryption tasks, decryption tasks, authentication tasks, password tasks, or otherwise. Device driver 3022 may be configured to allow higher level software to interact with the hardware with the hardware of, for example, communication device 120, USB interface 2728, and/or wireless communications device 3030. Browser module 3008 may be configured to provide a user of the vehicle control with web-browser functionality for viewing Internet sites, Intranet sites, locally stored HTTP pages, or otherwise.

While the exemplary embodiments illustrated in the figures and described herein are presently preferred, it should be understood that the embodiments are offered by way of example only. Accordingly, the present application is not limited to a particular embodiment, but extends to various modifications that nevertheless fall within the scope of the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for mounting in a vehicle and for providing information to a portable electronic device for processing by the portable electronic device, the control system comprising:

a first interface for communicating with the portable electronic device;

a second interface for coupling to an audio input device mounted to the vehicle interior and for receiving voice information from a user;

a third interface for providing display information to an electronic display device mounted to the vehicle interior;

a memory device;

a processing circuit communicably coupled to the first interface and the memory device, wherein the processing circuit comprises a speech recognition module configured to convert the voice information received at the second interface into text characters, wherein the processing circuit configured to:

determine the capabilities of the portable electronic device based on data received from the portable electronic device via the first interface;

determine whether to communicate the information to the portable electronic device based on the determined capabilities;

extract information from the memory device and to provide the information to the first interface so that the first interface communicates the information to the portable electronic device, wherein the information communicated to the portable electronic device comprises the text characters from the speech recognition module;

enter a voice-typing mode of operation, wherein, during the voice-typing mode of operation, the processing circuit is configured to cause the electronic display device to display the text characters from the speech recognition module; and magnify a recently converted text character relative to previously converted text characters on the electronic display device.

2. The control system of claim 1, wherein the processing circuit is further configured to communicate the text characters to the portable electronic device in a format that causes the text characters to be entered into a text field displayed on the portable electronic device.

3. The control system of claim 1, wherein the processing circuit is further configured to communicate the text characters to the portable electronic device in a format that causes the portable electronic device to provide the text characters to an application running on the portable electronic device, wherein the application is at least one of: a text-messaging application, a calendaring application, a mobile commerce application, a web-browsing application, a gaming application, a navigation application, an e-mail application, a media application, and a notes application.

* * * * *